United States Patent
Bernat et al.

(10) Patent No.: US 10,656,864 B2
(45) Date of Patent: May 19, 2020

(54) DATA REPLICATION WITHIN A FLASH STORAGE ARRAY

(71) Applicant: PURE Storage, Inc., Mountain View, CA (US)

(72) Inventors: Andrew R. Bernat, Mountain View, CA (US); Ganesh Ramanarayanan, Menlo Park, CA (US); Malcolm Sharpe, Mountain View, CA (US); Steve Hodgson, Mountain View, CA (US); Ethan Miller, Santa Cruz, CA (US); Alan Driscoll, Fremont, CA (US); Christopher Golden, Mountain View, CA (US); John Colgrove, Los Altos, CA (US)

(73) Assignee: Pure Storage, Inc., Mountain View, CA (US)

( * ) Notice: Subject to any disclaimer, the term of this patent is extended or adjusted under 35 U.S.C. 154(b) by 128 days.

(21) Appl. No.: 14/220,908

(22) Filed: Mar. 20, 2014

(65) Prior Publication Data
US 2015/0268864 A1 Sep. 24, 2015

(51) Int. Cl.
G06F 3/06 (2006.01)
G06F 11/14 (2006.01)

(52) U.S. Cl.
CPC .............. *G06F 3/065* (2013.01); *G06F 3/061* (2013.01); *G06F 3/0604* (2013.01); *G06F 3/067* (2013.01); *G06F 3/0683* (2013.01); *G06F 3/0608* (2013.01); *G06F 3/0641* (2013.01); *G06F 11/1453* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 5,208,813 A | 5/1993 | Stallmo | |
| 5,403,639 A | 4/1995 | Belsan | |
| 5,940,838 A | 8/1999 | Schmuck et al. | |
| 6,263,350 B1 | 7/2001 | Wollrath et al. | |

(Continued)

FOREIGN PATENT DOCUMENTS

| | | |
|---|---|---|
| CN | 103370685 A | 10/2013 |
| CN | 103370686 A | 10/2013 |

(Continued)

OTHER PUBLICATIONS

PCT Search Report and Written Opinion, dated Jul. 31, 2015; PCT Application No. PCT/US2015/021690, 12 pages.

(Continued)

*Primary Examiner* — Ann J Lo
*Assistant Examiner* — Jane Wei

(57) ABSTRACT

A system and method for performing replication using mediums. A snapshot 'S' is selected for replication, and the anchor medium 'M' of S is identified. The replica storage array 'R' to which M is being replicated determines a list of medium extents which are available. R sends this list to an original storage array 'O' and O generates a list of medium extents which need to be sent to R. Only those medium extents corresponding to M which R does not already have will be sent from O to R. Also, R can obtain medium extents from other source storage arrays during the replication process.

17 Claims, 14 Drawing Sheets

(56) References Cited

U.S. PATENT DOCUMENTS

| | | |
|---|---|---|
| 6,412,045 B1 | 6/2002 | DeKoning et al. |
| 6,718,448 B1 | 4/2004 | Ofer |
| 6,757,769 B1 | 6/2004 | Ofer |
| 6,799,283 B1 | 9/2004 | Masaaki et al. |
| 6,834,298 B1 | 12/2004 | Singer et al. |
| 6,850,938 B1 | 2/2005 | Sadjadi |
| 6,915,434 B1 | 7/2005 | Kuroda |
| 6,973,549 B1 | 12/2005 | Testardi |
| 6,993,539 B2* | 1/2006 | Federwisch ......... G06F 11/2066 707/999.201 |
| 7,028,216 B2 | 4/2006 | Aizawa et al. |
| 7,028,218 B2 | 4/2006 | Schwarm et al. |
| 7,039,827 B2 | 5/2006 | Meyer et al. |
| 7,216,164 B1 | 5/2007 | Whitmore et al. |
| 7,783,682 B1 | 8/2010 | Patterson |
| 7,873,619 B1 | 1/2011 | Faibish et al. |
| 7,913,300 B1 | 3/2011 | Flank et al. |
| 7,933,936 B2 | 4/2011 | Aggarwal et al. |
| 7,979,613 B2 | 7/2011 | Zohar et al. |
| 8,086,652 B1 | 12/2011 | Bisson et al. |
| 8,099,571 B1* | 1/2012 | Driscoll ............... G06F 11/2066 707/655 |
| 8,117,464 B1 | 2/2012 | Kogelnik |
| 8,190,835 B1 | 5/2012 | Yueh |
| 8,205,065 B2 | 6/2012 | Matze |
| 8,352,540 B2 | 1/2013 | Anglin et al. |
| 8,402,250 B1* | 3/2013 | Juillard ............. G06F 17/30159 711/154 |
| 8,527,544 B1 | 9/2013 | Colgrove et al. |
| 8,560,747 B1 | 10/2013 | Tan et al. |
| 8,621,241 B1 | 12/2013 | Stephenson |
| 8,700,875 B1 | 4/2014 | Barron et al. |
| 8,732,411 B1* | 5/2014 | Chatterjee ............. G06F 3/0641 711/147 |
| 8,751,463 B1 | 6/2014 | Chamness |
| 8,806,160 B2 | 8/2014 | Colgrove et al. |
| 8,874,850 B1 | 10/2014 | Goodson et al. |
| 8,959,305 B1 | 2/2015 | Lecrone et al. |
| 9,423,967 B2 | 8/2016 | Colgrove et al. |
| 9,436,396 B2 | 9/2016 | Colgrove et al. |
| 9,436,720 B2 | 9/2016 | Colgrove et al. |
| 9,454,476 B2 | 9/2016 | Colgrove et al. |
| 9,454,477 B2 | 9/2016 | Colgrove et al. |
| 9,513,820 B1 | 12/2016 | Shalev |
| 9,516,016 B2 | 12/2016 | Colgrove et al. |
| 9,552,248 B2 | 1/2017 | Miller et al. |
| 2002/0038436 A1 | 3/2002 | Suzuki |
| 2002/0087544 A1 | 7/2002 | Selkirk et al. |
| 2002/0178335 A1 | 11/2002 | Selkirk et al. |
| 2003/0140209 A1 | 7/2003 | Testardi |
| 2003/0182312 A1 | 9/2003 | Chen et al. |
| 2004/0049572 A1 | 3/2004 | Yamamoto et al. |
| 2005/0066095 A1 | 3/2005 | Mullick et al. |
| 2005/0216535 A1 | 9/2005 | Saika et al. |
| 2005/0223154 A1 | 10/2005 | Uemura |
| 2006/0074940 A1 | 4/2006 | Craft et al. |
| 2006/0136365 A1 | 6/2006 | Kedem et al. |
| 2006/0155946 A1 | 7/2006 | Ji |
| 2007/0067585 A1 | 3/2007 | Ueda et al. |
| 2007/0162954 A1 | 7/2007 | Pela |
| 2007/0171562 A1 | 7/2007 | Maejima et al. |
| 2007/0174673 A1 | 7/2007 | Kawaguchi et al. |
| 2007/0220313 A1 | 9/2007 | Katsuragi et al. |
| 2007/0245090 A1 | 10/2007 | King et al. |
| 2007/0266179 A1 | 11/2007 | Chavan et al. |
| 2008/0010322 A1* | 1/2008 | Lee .................. G06F 17/30174 |
| 2008/0059699 A1 | 3/2008 | Kubo et al. |
| 2008/0065852 A1 | 3/2008 | Moore et al. |
| 2008/0134174 A1 | 6/2008 | Sheu et al. |
| 2008/0155191 A1 | 6/2008 | Anderson et al. |
| 2008/0178040 A1 | 7/2008 | Kobayashi |
| 2008/0209096 A1 | 8/2008 | Lin et al. |
| 2008/0244205 A1 | 10/2008 | Amano et al. |
| 2008/0256326 A1* | 10/2008 | Patterson .......... G06F 17/30312 711/206 |
| 2008/0275928 A1 | 11/2008 | Shuster |
| 2008/0285083 A1 | 11/2008 | Aonuma |
| 2008/0307270 A1 | 12/2008 | Li |
| 2009/0006587 A1 | 1/2009 | Richter |
| 2009/0037662 A1 | 2/2009 | La Frese et al. |
| 2009/0204858 A1 | 8/2009 | Kawaba |
| 2009/0228648 A1 | 9/2009 | Wack |
| 2009/0300084 A1 | 12/2009 | Whitehouse |
| 2010/0057673 A1 | 3/2010 | Savov |
| 2010/0058026 A1 | 3/2010 | Heil et al. |
| 2010/0067706 A1 | 3/2010 | Anan et al. |
| 2010/0077205 A1 | 3/2010 | Ekstrom et al. |
| 2010/0082879 A1 | 4/2010 | McKean et al. |
| 2010/0106905 A1 | 4/2010 | Kurashige et al. |
| 2010/0153620 A1 | 6/2010 | McKean et al. |
| 2010/0153641 A1 | 6/2010 | Jagadish et al. |
| 2010/0191897 A1 | 7/2010 | Zhang et al. |
| 2010/0250802 A1 | 9/2010 | Waugh et al. |
| 2010/0250882 A1 | 9/2010 | Hutchison et al. |
| 2010/0281225 A1 | 11/2010 | Chen et al. |
| 2010/0287327 A1 | 11/2010 | Li et al. |
| 2011/0071980 A1 | 3/2011 | Patterson |
| 2011/0072303 A1 | 3/2011 | Rousseau |
| 2011/0145598 A1 | 6/2011 | Smith et al. |
| 2011/0161559 A1 | 6/2011 | Yurzola et al. |
| 2011/0167221 A1 | 7/2011 | Pangal et al. |
| 2011/0238634 A1 | 9/2011 | Kobara |
| 2012/0023375 A1 | 1/2012 | Dutta et al. |
| 2012/0036309 A1 | 2/2012 | Dillow et al. |
| 2012/0117029 A1 | 5/2012 | Gold |
| 2012/0198175 A1 | 8/2012 | Atkisson |
| 2012/0330954 A1 | 12/2012 | Sivasubramanian et al. |
| 2013/0042052 A1 | 2/2013 | Colgrove et al. |
| 2013/0046995 A1 | 2/2013 | Movshovitz |
| 2013/0047029 A1 | 2/2013 | Ikeuchi et al. |
| 2013/0054523 A1* | 2/2013 | Anglin ............. G06F 17/30575 707/624 |
| 2013/0091102 A1 | 4/2013 | Nayak |
| 2013/0205110 A1 | 8/2013 | Kettner |
| 2013/0227236 A1 | 8/2013 | Flynn et al. |
| 2013/0275391 A1 | 10/2013 | Batwara et al. |
| 2013/0275656 A1 | 10/2013 | Talagala et al. |
| 2013/0283058 A1 | 10/2013 | Fiske et al. |
| 2013/0290648 A1 | 10/2013 | Shao et al. |
| 2013/0318314 A1 | 11/2013 | Markus et al. |
| 2013/0339303 A1 | 12/2013 | Potter et al. |
| 2014/0052946 A1 | 2/2014 | Kimmel |
| 2014/0068791 A1 | 3/2014 | Resch |
| 2014/0089730 A1 | 3/2014 | Watanabe et al. |
| 2014/0101361 A1 | 4/2014 | Gschwind |
| 2014/0143517 A1 | 5/2014 | Jin et al. |
| 2014/0172929 A1 | 6/2014 | Sedayao et al. |
| 2014/0201150 A1 | 7/2014 | Kumarasamy et al. |
| 2014/0215129 A1 | 7/2014 | Kuzmin et al. |
| 2014/0229131 A1 | 8/2014 | Cohen et al. |
| 2014/0229452 A1 | 8/2014 | Serita et al. |
| 2014/0281308 A1 | 9/2014 | Lango et al. |
| 2014/0325115 A1 | 10/2014 | Ramsundar et al. |
| 2014/0351214 A1* | 11/2014 | Abercrombie .... G06F 17/30575 707/626 |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |
| 2016/0098191 A1 | 4/2016 | Golden et al. |
| 2016/0098199 A1 | 4/2016 | Golden et al. |

FOREIGN PATENT DOCUMENTS

| | | |
|---|---|---|
| CN | 104025010 B | 11/2016 |
| EP | 3066610 A1 | 9/2016 |
| EP | 3082047 A1 | 10/2016 |
| EP | 3120235 A | 1/2017 |
| JP | 2007-087036 A | 4/2007 |
| JP | 2007-094472 A | 4/2007 |
| JP | 2008-250667 A | 10/2008 |
| JP | 2010-211681 A | 9/2010 |

(56) References Cited

FOREIGN PATENT DOCUMENTS

| WO | WO-1995/002349 A1 | 1/1995 |
| WO | WO-1999/013403 A1 | 3/1999 |
| WO | WO-2008/102347 A1 | 8/2008 |
| WO | WO-2010/071655 A1 | 6/2010 |

OTHER PUBLICATIONS

Microsoft Corporation, "GCSettings.IsServerGC Property", Retrieved Oct. 27, 2013 via the WayBack Machine, 3 pages.
Microsoft Corporation, "Fundamentals of Garbage Collection", Retrieved Aug. 30, 2013 via the WayBack Machine, 11 pages.

* cited by examiner

| Medium ID | Range | State | Basis | Offset | Underlying | Stable |
|---|---|---|---|---|---|---|
| 1 | 0-999 | Q | 1 | 0 | 1 | Y |
| 2 | 0-99 | QU | 2 | 0 | 1 | Y |
| 2 | 100-999 | Q | 2 | 0 | 1 | Y |
| 5 | 0-999 | RU | 5 | 0 | 2 | N |
| 8 | 0-499 | R | 8 | 500 | 1 | N |
| 10 | 0-999 | QU | 10 | 0 | 1 | Y |
| 14 | 0-999 | RU | 14 | 0 | 10 | Y |
| 18 | 0-999 | RU | 18 | 0 | 14 | N |
| 25 | 0-999 | RU | 25 | 0 | 14 | Y |
| 33 | 0-999 | RU | 33 | 0 | 25 | N |
| 35 | 0-299 | RU | 35 | 400 | 18 | N |
| 35 | 300-499 | RU | 35 | -300 | 33 | Y |
| 35 | 500-899 | RU | 35 | -400 | 5 | N |

Q – Quiescent; R – Registered; U – Unmask

*FIG. 3*

| Original System ID | Original Medium ID | Local Medium ID |
|---|---|---|
| 540 | 150 | 5 |
| 540 | 180 | 12 |
| 540 | 225 | 18 |
| ⋮ | ⋮ | ⋮ |
| 530 | 637 | 25 |
| ⋮ | ⋮ | ⋮ |

Table 600

FIG. 6

| Original System ID | Original Medium ID | Local Medium ID | |
|---|---|---|---|
| 745 | 725 | 36 | Table 765 |
| ⋮ | ⋮ | ⋮ | |

| Medium ID | Range | Unmasked State | Offset | Underlying | |
|---|---|---|---|---|---|
| 36 | 0 to (A-1) | Unmasked | 0 | 36 | Table 770 |
| ⋮ | ⋮ | ⋮ | ⋮ | ⋮ | |

| Medium ID | Range | Unmasked State | Offset | Underlying | |
|---|---|---|---|---|---|
| 710 | 0 to (A-1) | Unmasked | 0 | 710 | Table 700 |
| 710 | A to (B-1) | Unmasked | 0 | 710 | |
| 710 | B to (C-1) | Masked | -B | 645 | |
| 710 | C to (D-1) | Masked | 0 | 650 | |
| 710 | D to (E-1) | Unmasked | 0 | 710 | |
| ⋮ | ⋮ | ⋮ | ⋮ | ⋮ | |
| 710 | M to (N-1) | Unmasked | 0 | 710 | |

List 715A:

| Medium ID | Range |
|---|---|
| 725 | 0 to (A-1) |
| ⋮ | ⋮ |

Duplicate Extents Table 730:

| Medium ID | Range | Duplicate Range |
|---|---|---|
| 710 | C to (D-1) | B to (C-1) |
| 710 | M to (N-1) | D to (E-1) |
| ⋮ | ⋮ | ⋮ |

Medium Mapping Table 755:

| Medium ID | Range | Unmasked State | Offset | Underlying |
|---|---|---|---|---|
| 725 | 0 to (A-1) | Masked | 0 | 710 |
| 650 | C to (D-1) | Masked | -C | 645 |
| ⋮ | ⋮ | ⋮ | ⋮ | ⋮ |

Physical to Logical Address Mappings Table 760A:

| Physical Address | Sector |
|---|---|
| - | - |

FIG. 7

Table 800

| Medium ID | Range | Reference or Data? | Reference to Medium ID: Range |
|---|---|---|---|
| 710 | 0 to (A-1) | Reference | 710: 0 to (A-1) |
| 710 | A to (B-1) | Data | - |
| 710 | B to (C-1) | Data | - |
| 710 | C to (D-1) | Reference | 710: B to (C-1) |
| 710 | D to (E-1) | Data | - |
| ⋮ | ⋮ | ⋮ | ⋮ |
| 710 | M to (N-1) | Reference | 710: D to (E-1) |

List 715B

| Medium ID | Range |
|---|---|
| 725 | 0 to (A-1) |
| ⋮ | ⋮ |
| 710 | A to (B-1) |

List 715C

| Medium ID | Range |
|---|---|
| 725 | 0 to (A-1) |
| ⋮ | ⋮ |
| 710 | A to (B-1) |
| 710 | B to (C-1) |
| 710 | D to (E-1) |

Physical to Logical Address Mappings Table 760B

| Physical Address | Sector |
|---|---|
| 762X | <710, 1> |
| 763X | <710, 2> |
| 764X | <710, 4> |

FIG. 8

DATA REPLICATION WITHIN A FLASH STORAGE ARRAY

BACKGROUND OF THE INVENTION

Field of the Invention

This invention relates to performing remote replication using mediums in a storage system.

Description of the Related Art

Businesses and organizations require comprehensive data storage solutions for facilitating the storage of increasing amounts of data while making the data continuously available. The importance of data to a company's operations necessitates that the data be backed up to protect against corruption or loss. Many techniques can be utilized to protect the data and ensure that the data is continuously available. One of these techniques is remote replication.

Remote replication is the process of copying data to storage devices at a remote location for data protection or disaster recovery purposes. In some cases, remote replication may be used to copy a user volume to a replica system with a separate failure domain from the original system. One way of performing replication is to send the entire volume from the original system to the replica system. While this approach is simple, it is also inefficient and may consume significant resources. In some cases, it may be possible to perform replication without sending all of the data of the selected volume. However, quickly and efficiently determining the best approach for performing replication may be challenging based on the increasing amount of data being stored in volumes and the manner in which data is managed on the original and replica storage systems.

In view of the above, techniques for efficiently performing replication are desired.

SUMMARY OF THE INVENTION

Various embodiments of systems and methods for performing remote replication using mediums are contemplated.

In one embodiment, a storage array may include a storage controller and one or more storage devices. The storage array may also be coupled to one or more other storage arrays. In one embodiment, the storage controller may utilize volumes and mediums to track client data that is stored in the storage system. A medium is defined as a logical grouping of data, and each medium has an identifier with which to identify the logical grouping of data.

In one embodiment, a replica storage array may be coupled to an original storage array. The original storage array may store a plurality of volumes and a plurality of snapshots of these volumes. In various embodiments, one or more snapshot(s) may be selected for replication when the replica storage array connects to the original storage array.

In one embodiment, a snapshot S of volume V may exist on the replica storage array. A later snapshot S' may be taken of volume V by the original storage array. Since the replica storage array already contains snapshot S, the original storage array only needs to transfer the data in S' but not in S. The original storage array may determine which data in S' is unique to S' and which regions fall through and are actually in S by reading one or more medium maps.

In one embodiment, in response to detecting a request to replicate a snapshot of a given volume, the corresponding anchor medium on the original storage array may be made stable by taking a snapshot of the volume. The anchor medium of the snapshot may then be replicated, and this anchor medium may be referred to as M. Alternatively, the replica storage array may select which snapshot it wishes to replicate from a list of snapshots provided by the original storage array of a given volume. The anchor medium refers to the medium pointed to by the given volume. When a snapshot is taken of a volume, the volume's anchor medium is made stable, which means the anchor medium is read-only from that point in time forward. Also, as part of taking a snapshot of a volume, a new medium is created, and the volume will then point to this new medium, which becomes the new anchor medium of the volume. The new anchor medium will then point to the previous anchor medium.

Once a medium M has been selected for replication, the replica storage array may generate a list of medium extents (or regions) that it maintains locally and supply this list to the original storage array. In one embodiment, the replica storage array may utilize its mapping table to identify all of the mediums from the original storage array that are available for use as sources for deduplicated data.

The original storage array may utilize the list of medium extents from the replica storage array and the data associated with M from its own medium mapping table to build a list of information that needs to be sent to the replica storage array. The original storage array may then emit information to the replica storage array based on this list of information. For data that the original storage array determines already exists in a given medium extent already stored on the replica storage array, the original storage array may send a reference to this given medium extent to the replica storage array rather than sending the actual data. This reduces the amount of data that needs to be sent from the original storage array to the replica storage array.

As part of the replication process, the original storage array may build up a set D of medium extents of the medium M that are mapped to one another. This set D of duplicate extents includes all instances of extents within medium M that are pointed to by more than one extent. The original storage array may also initialize a set Z of sectors that the replica storage array already contains by inserting all of the sector ranges covered by the medium extents that the replica storage array sent to the original storage array. The original storage array may also initialize a set of mappings P from physical addresses (X) to logical addresses <M, sector> to be empty. For each sector s in M, the function emit_sector (M,s) may be called. Once the appropriate information has been emitted, the information may be packaged into an rblock and sent to the replica storage array. Each packet of information sent from the original storage array to the replica storage array may be referred to as an "rblock" or a "quantum".

The function emit_sector (M,s) when called may traverse the medium extent table for sector 's' of medium 'M' until one of the following conditions is detected: Condition A: Detect if the sector <M,s> maps to a sector in Z called <Q,t>. If this condition is detected, then a reference may be emitted for <M,s>→<Q,t>. Condition B: Detect a hit for a sector <F,t> that's in the set D, where F≠M. When condition B is detected, this indicates that the medium extent in the medium mapping table maps to a different medium. The hit entry for sector <F,t> may be flattened in the medium mapping table to optimize transmission. Condition C: An actual physical mapping X is hit that contains data for the sector. If P already contains a mapping from X<O,t>, then a reference from <M,s>→<O,t> may be emitted. Otherwise, the logical address of the sector <M,s> may be emitted followed by the data for the sector. Also, the mapping from X to <M,s> may be added to P so that deduplication may be performed on the fly to save network bandwidth. In one embodiment, these three conditions may be checked in parallel, but Condition A may take precedence over Condition B, and Condition B may take precedence over Condition C.

These and other embodiments will become apparent upon consideration of the following description and accompanying drawings.

BRIEF DESCRIPTION OF THE DRAWINGS

FIG. 3 illustrates one embodiment of a medium mapping table.

FIG. 6 illustrates one embodiment of a table for mapping original system ID to local medium ID.

FIG. 7 illustrates one embodiment of a set of tables utilized during a replication process.

FIG. 8 illustrates another embodiment of a set of tables utilized during a replication process.

Figure 1:
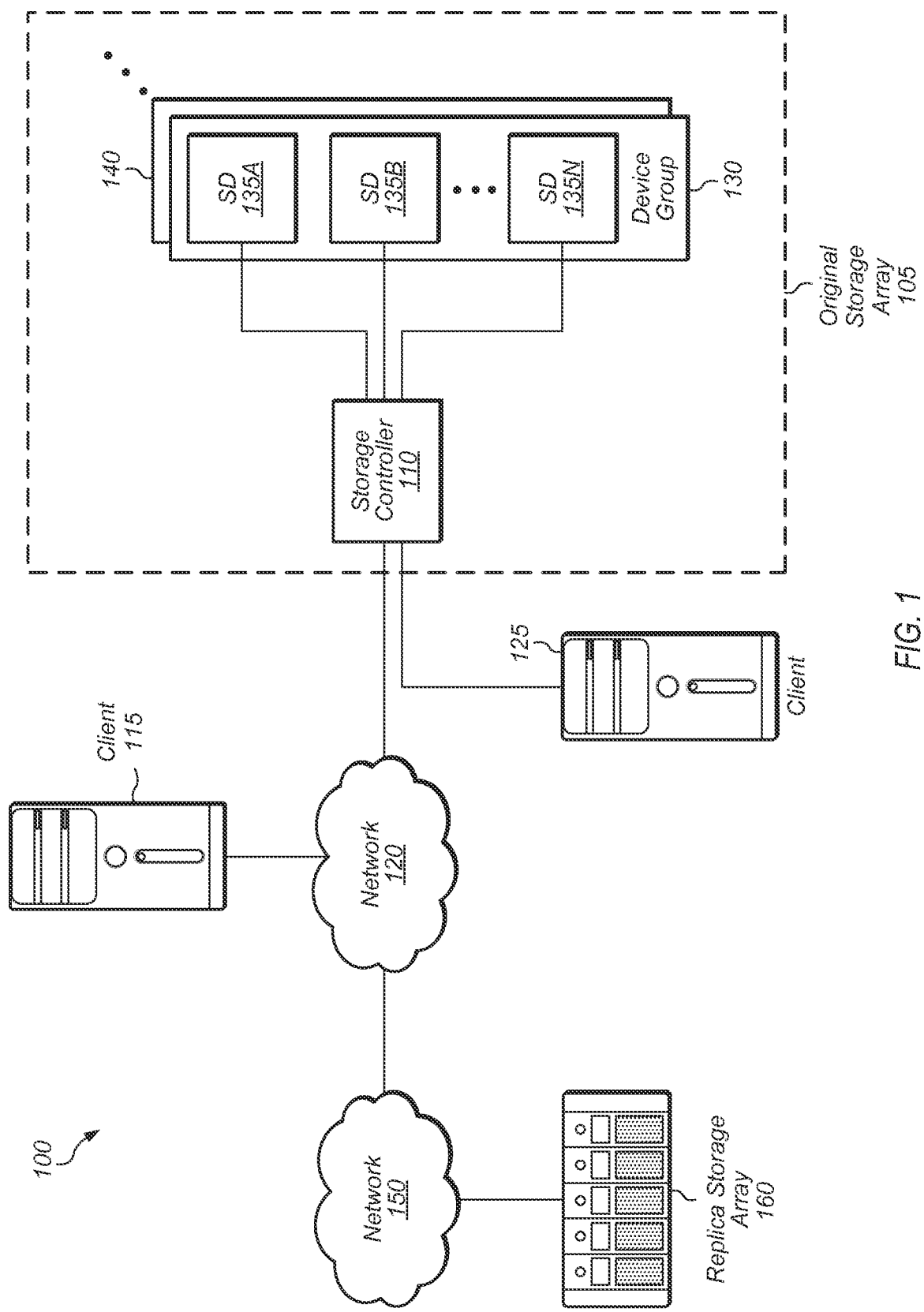
FIG. 1 is a generalized block diagram illustrating one embodiment of a storage system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring now to FIG. 1, a generalized block diagram of one embodiment of a storage system 100 is shown. Storage system 100 may include original storage array 105 and replica storage array 160. Original storage array 105 may include storage controller 110 and storage device groups 130 and 140, which are representative of any number of storage device groups (or data storage arrays). Although not shown in FIG. 1, replica storage array 160 may also include a storage controller and one or more storage device groups.

As shown, storage device group 130 includes storage devices 135A-N, which are representative of any number and type of storage devices (e.g., solid-state drives (SSDs)). Storage controller 110 may be coupled directly to client computer system 125, and storage controller 110 may be coupled remotely over network 120 to client computer system 115. Clients 115 and 125 are representative of any number of clients which may utilize storage controller 110 for storing and accessing data in system 100. It is noted that some systems may include only a single client, connected directly or remotely to storage controller 110.

Storage controller 110 may include software and/or hardware configured to provide access to storage devices 135A-N. Although storage controller 110 is shown as being separate from storage device groups 130 and 140, in some embodiments, storage controller 110 may be located within one or each of storage device groups 130 and 140. Storage controller 110 may include or be coupled to a base operating system (OS), a volume manager, and additional control logic for implementing the various techniques disclosed herein.

Storage controller 110 may include and/or execute on any number of processors and may include and/or execute on a single host computing device or be spread across multiple host computing devices, depending on the embodiment. In some embodiments, storage controller 110 may generally include or execute on one or more file servers and/or block servers. Storage controller 110 may use any of various techniques for replicating data across devices 135A-N to prevent loss of data due to the failure of a device or the failure of storage locations within a device. Storage controller 110 may also utilize any of various fine-grained deduplication techniques for reducing the amount of data stored in devices 135A-N by deduplicating common data segments.

Storage controller 110 may also be configured to create and manage snapshots in system 100. Accordingly, a set of mediums may be recorded and maintained by storage controller 110. A medium may be defined as a container for blocks of user data. A medium may be virtual such that it is identified by a unique ID, and all blocks stored to a volume while the corresponding medium is open for writing are recorded as <medium, block number>. Most of the mediums may be read-only except for one or more selected mediums such as the most recent medium in use by a particular volume. A read-only medium may represent a previously taken snapshot. Each medium logically comprises all of the blocks in the medium. However, only the blocks that were written to the medium from the time the medium was created to the time the medium was closed are recorded and mappings to these blocks may also be maintained with the medium.

In system 100, snapshots may be replicated from original storage array 105 to replica storage array 160. For example, replica storage array 160 may decide which particular snapshots to replicate when replica storage array 160 connects to original storage array 105. Alternatively, original storage array 105 may make a policy decision and inform replica storage array 160 to pull a particular snapshot. Replica storage array 160 may then choose to pull the medium corresponding to the particular snapshot from original storage array 105 or any other storage array (not shown) it has access to. Original storage array 105 may utilize a variety of techniques to minimize the amount of data sent to replica storage array 160 for a given snapshot. Additionally, original storage array 105 may perform deduplication and flatten mapping table entries as part of the replication process.

In various embodiments, multiple mapping tables may be maintained by storage controller 110. These mapping tables may include a medium mapping table, a volume-to-medium mapping table, an address translation table, a deduplication table, an overlay table, and/or other tables. In some embodiments, the information stored in two or more of these tables may be combined into a single table. The medium mapping table may be utilized to record and maintain the mappings between mediums and underlying mediums and the volume-to-medium mapping table may be utilized to record and maintain the mappings between volumes and mediums.

The address translation table may include a plurality of entries, with each entry holding a virtual-to-physical mapping for a corresponding data component. This mapping table may be used to map logical read/write requests from each of the client computer systems 115 and 125 to physical locations in storage devices 135A-N. A "physical" pointer value may be read from the mappings associated with a given medium during a lookup operation corresponding to a received read/write request. This physical pointer value may then be used to locate a physical location within the storage devices 135A-N. It is noted that the physical pointer value may be used to access another mapping table within a given storage device of the storage devices 135A-N. Consequently, one or more levels of indirection may exist between the physical pointer value and a target storage location.

In various embodiments, the address translation table may be accessed using a key comprising a medium ID, a logical or virtual address, a sector number, and so forth. A received read/write storage access request may identify a particular volume, sector, and length. The volume ID may be mapped to a medium ID using the volume to medium mapping table. A sector may be a logical block of data stored in a medium. Sectors may have different sizes on different mediums. The address translation table may map a medium in sector-size units. In one embodiment, the key value for accessing the address translation table may be the combination of the medium ID and the received sector number. A key is an entity in a mapping table that distinguishes one row of data from another row. In other embodiments, other types of address translation tables may be utilized.

In one embodiment, the address translation table may map mediums and block offsets to physical pointer values. Depending on the embodiment, a physical pointer value may be a physical address or a logical address which the storage device maps to a physical location within the device. In one embodiment, an index may be utilized to access the address translation table. The index may identify locations of mappings within the address translation table. The index may be queried with a key value generated from a medium ID and sector number, and the index may be searched for one or more entries which match, or otherwise correspond to, the key value. Information from a matching entry may then be used to locate and retrieve a mapping which identifies a storage location which is the target of a received read or write request. In one embodiment, a hit in the index provides a corresponding virtual page ID identifying a page within the storage devices of the storage system, with the page storing both the key value and a corresponding physical pointer value. The page may then be searched with the key value to find the physical pointer value.

The deduplication table may include information used to deduplicate data at a fine-grained level. The information stored in the deduplication table may include mappings between one or more calculated hash values for a given data component and a physical pointer to a physical location in one of the storage devices 135A-N holding the given data component. In addition, a length of the given data component and status information for a corresponding entry may be stored in the deduplication table. It is noted that in some embodiments, one or more levels of indirection may exist between the physical pointer value and the corresponding physical storage location. Accordingly, in these embodiments, the physical pointer may be used to access another mapping table within a given storage device of the storage devices 135A-N.

It is noted that in alternative embodiments, the number and type of client computers, storage controllers, networks, storage device groups, and data storage devices is not limited to those shown in FIG. 1. At various times one or more clients may operate offline. In addition, during operation, individual client computer connection types may change as users connect, disconnect, and reconnect to system 100. Further, the systems and methods described herein may be applied to directly attached storage systems or network attached storage systems and may include a host operating system configured to perform one or more aspects of the described methods. Numerous such alternatives are possible and are contemplated.

Networks 120 and 150 may utilize a variety of techniques including wireless connection, direct local area network (LAN) connections, wide area network (WAN) connections such as the Internet, a router, storage area network, Ethernet, and others. Networks 120 and 150 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in networks 120 and 150. The networks 120 and 150 may interface with a set of communications protocols used for the Internet such as the Transmission Control Protocol (TCP) and the Internet Protocol (IP), or TCP/IP.

Client computer systems 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 115 and 125 include one or more processors comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Figure 2:
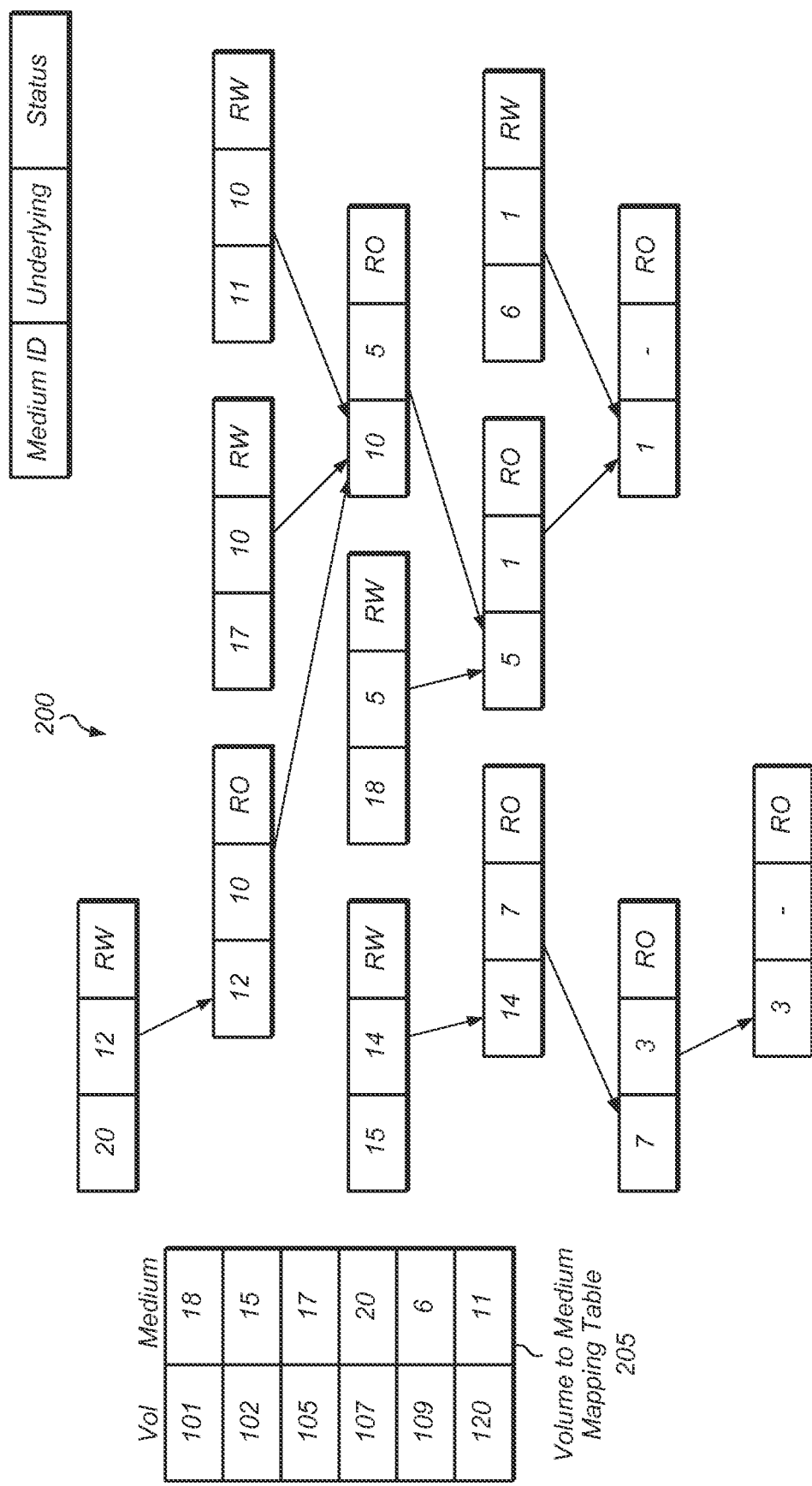
FIG. 2 is a generalized block diagram of one embodiment of a directed acyclic graph (DAG) of mediums.

Referring now to FIG. 2, a block diagram illustrating a directed acyclic graph (DAG) 200 of mediums is shown. Also shown is a volume to medium mapping table 205 that shows which medium a volume maps to for each volume in use by a storage system. Volumes may be considered pointers into graph 200.

The term "medium" as is used herein is defined as a logical grouping of data. A medium may have a corresponding identifier with which to identify the logical grouping of data. Each medium may also include or be associated with mappings of logical block numbers to content location, deduplication entries, and other information. In one embodiment, medium identifiers may be used by the storage controller but medium identifiers may not be user-visible. A user (or client) may send a data request accompanied by a volume ID to specify which data is targeted by the request, and the storage controller may map the volume ID to a medium ID and then use the medium ID when processing the request.

The term "medium" is not to be confused with the terms "storage medium" or "computer readable storage medium". A storage medium is defined as an actual physical device (e.g., SSD, HDD) that is utilized to store data. A computer readable storage medium (or non-transitory computer readable storage medium) is defined as a physical storage medium configured to store program instructions which are executable by a processor or other hardware device. Various types of program instructions that implement the methods and/or mechanisms described herein may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

It is also noted that the term "volume to medium mapping table" may refer to multiple tables rather than just a single table. Similarly, the term "medium mapping table" may also refer to multiple tables rather than just a single table. It is further noted that volume to medium mapping table 205 is only one example of a volume to medium mapping table. Other volume to medium mapping tables may have other numbers of entries for other numbers of volumes.

Each medium is depicted in graph 200 as three conjoined boxes, with the leftmost box showing the medium ID, the middle box showing the underlying medium, and the rightmost box displaying the status of the medium (RO—read-only) or (RW—read-write). Read-write mediums may be referred to as active mediums, while read-only mediums may represent previously taken snapshots. Within graph 200, a medium points to its underlying medium. For example, medium 20 points to medium 12 to depict that medium 12 is the underlying medium of medium 20. Medium 12 also points to medium 10, which in turn points to medium 5, which in turn points to medium 1. Some mediums are the underlying medium for more than one higher-level medium. For example, three separate mediums (12, 17, 11) point to medium 10, two separate mediums (18, 10) point to medium 5, and two separate mediums (6, 5) point to medium 1. Each of the mediums which is an underlying medium to at least one higher-level medium has a status of read-only.

It is noted that the term "ancestor" may be used to refer to underlying mediums of a given medium. In other words, an ancestor refers to a medium which is pointed to by a first medium or which is pointed to by another ancestor of the first medium. For example, as described above and shown in FIG. 2, medium 20 points to medium 12, medium 12 points to medium 10, medium 10 points to medium 5, and medium 5 points to medium 1. Therefore, mediums 12, 10, 5, and 1 are ancestors of medium 20. Similarly, mediums 10, 5, and 1 are ancestors of medium 12.

The set of mediums on the bottom left of graph 200 is an example of a linear set. As depicted in graph 200, medium 3 was created first and then a snapshot was taken resulting in medium 3 becoming stable (i.e., the result of a lookup for a given block in medium 3 will always return the same value after this point). Medium 7 was created with medium 3 as its underlying medium. Any blocks written after medium 3 became stable were labeled as being in medium 7. Lookups to medium 7 return the value from medium 7 if one is found, but will look in medium 3 if a block is not found in medium 7. At a later time, a snapshot of medium 7 is taken, medium 7 becomes stable, and medium 14 is created. Lookups for blocks in medium 14 would check medium 7 and then medium 3 to find the targeted logical block. Eventually, a snapshot of medium 14 is taken and medium 14 becomes stable while medium 15 is created. At this point in graph 200, medium 14 is stable with writes to volume 102 going to medium 15.

Volume to medium mapping table 205 maps user-visible volumes to mediums. Each volume may be mapped to a single medium, also known as the anchor medium. This anchor medium, as with all other mediums, may take care of its own lookups. A medium on which multiple volumes depend (such as medium 10) tracks its own blocks independently of the volumes which depend on it. Each medium may also be broken up into ranges of blocks, and each range may be treated separately in medium DAG 200.

Referring now to FIG. 3, one embodiment of a medium mapping table 300 is shown. Any portion of or the entirety of medium mapping table 300 may be stored in storage controller 110 and/or in one or more of storage devices 135A-N. A volume identifier (ID) may be used to access volume to medium mapping table 205 to determine a medium ID corresponding to the volume ID. This medium ID may then be used to access medium mapping table 300. It is noted that table 300 is merely one example of a medium mapping table, and that in other embodiments, other medium mapping tables, with other numbers of entries, may be utilized. In addition, in other embodiments, a medium mapping table may include other attributes and be organized in a different manner than that shown in FIG. 3. It is also noted that any suitable data structure may be used to store the mapping table information in order to provide for efficient searches (e.g., b-trees, binary trees, hash tables, etc.). All such data structures are contemplated.

Each medium may be identified by a medium ID, as shown in the leftmost column of table 300. A range attribute may also be included in each entry of table 300, and the range may be in terms of data blocks. The size of a block of data (e.g., 4 KB, 8 KB) may vary depending on the embodiment. It is noted that the terms "range" and "extent" may be used interchangeably herein. A medium may be broken up into multiple ranges, and each range of a medium may be treated as if it is an independent medium with its own attributes and mappings. For example, medium ID 2 has two separate ranges. Range 0-99 of medium ID 2 has a separate entry in table 300 from the entry for range 100-999 of medium ID 2.

Although both of these ranges of medium ID 2 map to underlying medium ID 1, it is possible for separate ranges of the same source medium to map to different underlying mediums. For example, separate ranges from medium ID 35 map to separate underlying mediums. For example, range 0-299 of medium ID 35 maps to underlying medium ID 18 with an offset of 400. This indicates that blocks 0-299 of medium ID 35 map to blocks 400-699 of medium ID 18. Additionally, range 300-499 of medium ID 35 maps to underlying medium ID 33 with an offset of −300 and range 500-899 of medium ID 35 maps to underlying medium ID 5 with an offset of −400. These entries indicate that blocks 300-499 of medium ID 35 map to blocks 0-199 of medium ID 33, while blocks 500-899 of medium ID 35 map to blocks 100-499 of medium ID 5. It is noted that in other embodiments, mediums may be broken up into more than three ranges.

The state column of table 300 records information that allows lookups for blocks to be performed more efficiently. A state of "Q" indicates the medium is quiescent, "R" indicates the medium is registered, and "U" indicates the medium is unmasked. In the quiescent state, a lookup is performed on exactly one or two mediums specified in table 300. In the registered state, a lookup is performed recursively. The unmasked state determines whether a lookup should be performed in the basis medium, or whether the lookup should only be performed in the underlying medium. Although not shown in table 300 for any of the entries, another state "X" may be used to specify that the source medium is unmapped. The unmapped state indicates that the source medium contains no reachable data and can be discarded. This unmapped state may apply to a range of a source medium. If an entire medium is unmapped, then the medium ID may be entered into a sequence invalidation table and eventually discarded.

In one embodiment, when a medium is created, the medium is in the registered state if it has an underlying medium, or the medium is in the quiescent state if it is a brand-new volume with no pre-existing state. As the medium is written to, parts of it can become unmasked, with mappings existing both in the medium itself and the underlying medium. This may be done by splitting a single range into multiple range entries, some of which retain the original masked status, and others of which are marked as unmasked.

In addition, each entry in table 300 may include a basis attribute, which indicates the basis of the medium, which in this case points to the source medium itself. Each entry may also include an offset field, which specifies the offset that should be applied to the block address when mapping the source medium to an underlying medium. This allows mediums to map to other locations within an underlying medium rather than only being built on top of an underlying medium from the beginning block of the underlying medium. As shown in table 300, medium 8 has an offset of 500, which indicates that block 0 of medium 8 will map to block 500 of its underlying medium (medium 1). Therefore, a lookup of medium 1 via medium 8 will add an offset of 500 to the original block number of the request. The offset column allows a medium to be composed of multiple mediums. For example, in one embodiment, a medium may be composed of a "gold master" operating system image and per-VM (virtual machine) scratch space. Other flexible mappings are also possible and contemplated.

Each entry also includes an underlying medium attribute, which indicates the underlying medium of the source medium. If the underlying medium points to the source medium (as with medium 1), then this indicates that the source medium does not have an underlying medium, and all lookups will only be performed in the source medium. Each entry may also include a stable attribute, with "Y" (yes) indicating the medium is stable (or read-only), and with "N" (no) indicating the medium is read-write. In a stable medium, the data corresponding to a given block in the medium never changes, though the mapping that produces this data may change. For example, medium 2 is stable, but block 50 in medium 2 might be recorded in medium 2 or in medium 1, which may be searched logically in that order, though the searches may be done in parallel if desired. In one embodiment, a medium will be stable if the medium is used as an underlying medium by any medium other than itself.

Figure 4:
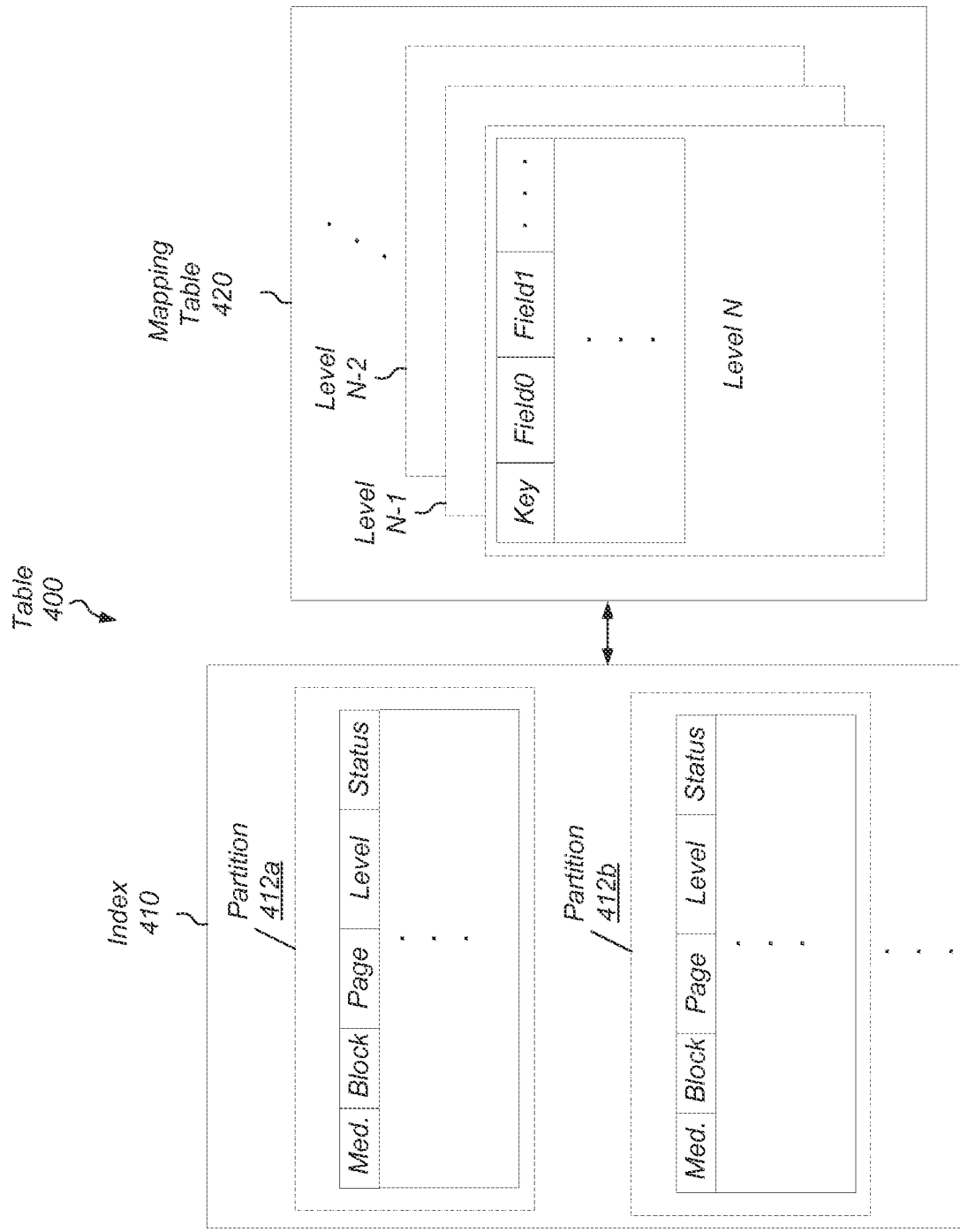
FIG. 4 illustrates one embodiment of a table utilized by a storage controller.

Turning now to FIG. 4, a block diagram of one embodiment of a table 400 is shown. In various embodiments, table 400 may be an address translation table, a deduplication table, an overlay table, or any other type of table utilized by a storage controller. In an embodiment with table 400 utilized as an address translation table, a given received read/write request received by a storage controller may identify a particular volume, sector (or block number), and length. The volume may be translated into a medium ID using the volume-to-medium mapping table. The medium ID and block number may then be used to access index 410 to locate an index entry corresponding to the specific medium ID and block number. The index entry may store at least one tuple including a key. Each index entry may also include a level ID and page ID of a corresponding entry in mapping table 420.

Using the level ID, page ID, and a key value generated from the medium ID and block number, the corresponding mapping table entry may be located and a pointer to the storage location may be returned from this entry. The pointer may be used to identify or locate data stored in the storage devices of the storage system. In addition to the pointer value, status information, such as a valid indicator, a data age, a data size, and so forth, may be stored in Field0 to FieldN shown in Level N of mapping table 420. It is noted that in various embodiments, the storage system may include storage devices (e.g., SSDs) which have internal mapping mechanisms. In such embodiments, the pointer in the mapping table entry may not be an actual physical address per se. Rather, the pointer may be a logical address which the storage device maps to a physical location within the device.

For the purposes of this discussion, the key value used to access entries in index 410 is the medium ID and block number corresponding to the data request. However, in other embodiments, other types of key values may be utilized. In these embodiments, a key generator may generate a key from the medium ID, block number, and/or one or more other requester data inputs, and the key may be used to access index 410 and locate a corresponding entry.

In one embodiment, index 410 may be divided into partitions, such as partitions 412a-412b. In one embodiment, the size of the partitions may range from a 4 kilobyte (KB) page to 256 KB, though other sizes are possible and are contemplated. Each entry of index 410 may store a key value, and the key value may be based on the medium ID, block number, and other values. For the purposes of this discussion, the key value in each entry is represented by the medium ID and block number. This is shown merely to aid in the discussion of mapping between mediums and entries in index 410. In other embodiments, the key values of entries in index 410 may vary in how they are generated.

In various embodiments, portions of index 410 may be cached, or otherwise stored in a relatively fast access memory. In various embodiments, the entire index 410 may be cached. In some embodiments, where the primary index has become too large to cache in its entirety, or is otherwise larger than desired, secondary, tertiary, or other index portions may be used in the cache to reduce its size. In addition to the above, in various embodiments mapping pages corresponding to recent hits may be cached for at least some period of time. In this manner, processes which exhibit accesses with temporal locality can be serviced more rapidly (i.e., recently accessed locations will have their mappings cached and readily available).

In some embodiments, index 410 may be a secondary index which may be used to find a key value for accessing a primary index. The primary index may then be used for locating corresponding entries in address translation table 400. It is to be understood that any number of levels of indexes may be utilized in various embodiments. In addition, any number of levels of redirection may be utilized for performing the address translation of received data requests, depending on the embodiment. In some embodiments, a corresponding index may be included in each level of mapping table 420 for mappings which are part of the level. Such an index may include an identification of mapping table entries and where they are stored (e.g., an identification of the page) within the level. In other embodiments, the index associated with mapping table entries may be a distinct entity, or entities, which are not logically part of the levels themselves. It is noted that in other embodiments, other types of indexes and mapping tables may be utilized to map medium IDs and block numbers to physical storage locations.

Mapping table 420 may comprise one or more levels. For example, in various embodiments, table 420 may comprise 16 to 64 levels, although other numbers of levels supported within a mapping table are possible and contemplated. Three levels labeled Level "N", Level "N−1" and Level "N−2" are shown for ease of illustration. Each level within table 420 may include one or more partitions. In one embodiment, each partition is a 4 kilo-byte (KB) page. In one embodiment, a corresponding index 410 may be included in each level of mapping table 420. In this embodiment, each level and each corresponding index 410 may be physically stored in a random-access manner within the storage devices.

In another embodiment, table 400 may be a deduplication table. A deduplication table may utilize a key comprising a hash value determined from a data component associated with a storage access request. For each data component, a deduplication application may be used to calculate a corresponding hash value. In order to know if a given data component corresponding to a received write request is already stored in one of the storage devices, bits of the calculated hash value (or a subset of bits of the hash value) for the given data component may be compared to bits in the hash values of data components stored in one or more of the storage devices.

In a further embodiment, table 400 may be an overlay table. One or more overlay tables may be used to modify or elide tuples corresponding to key values in the underlying mapping table and provided by other tables in response to a query. The overlay table(s) may be used to apply filtering conditions for use in responding to accesses to the mapping table or during flattening operations when a new level is created. Keys for the overlay table need not match the keys for the underlying mapping table. For example, an overlay table may contain a single entry stating that a particular range of data has been deleted or is otherwise inaccessible and that a response to a query corresponding to a tuple that refers to that range is invalid. In another example, an entry in the overlay table may indicate that a storage location has been freed, and that any tuple that refers to that storage location is invalid, thus invalidating the result of the lookup rather than the key used by the mapping table. In some embodiments, the overlay table may modify fields in responses to queries to the underlying mapping table. In some embodiments, a range of key values may be used to efficiently identify multiple values to which the same operation is applied. In this manner, tuples may effectively be "deleted" from the mapping table by creating an "elide" entry in the overlay table and without modifying the mapping table. The overlay table may be used to identify tuples that may be dropped from the mapping table in a relatively efficient manner. It is noted that in other embodiments, other types of mapping tables may be utilized with the replication techniques disclosed herein. For example, in another embodiment, a single log file may be utilized to map logical addresses to physical addresses. In a further embodiment, a key-value store may be utilized. Other structures of mapping tables are possible and are contemplated.

Figure 5:
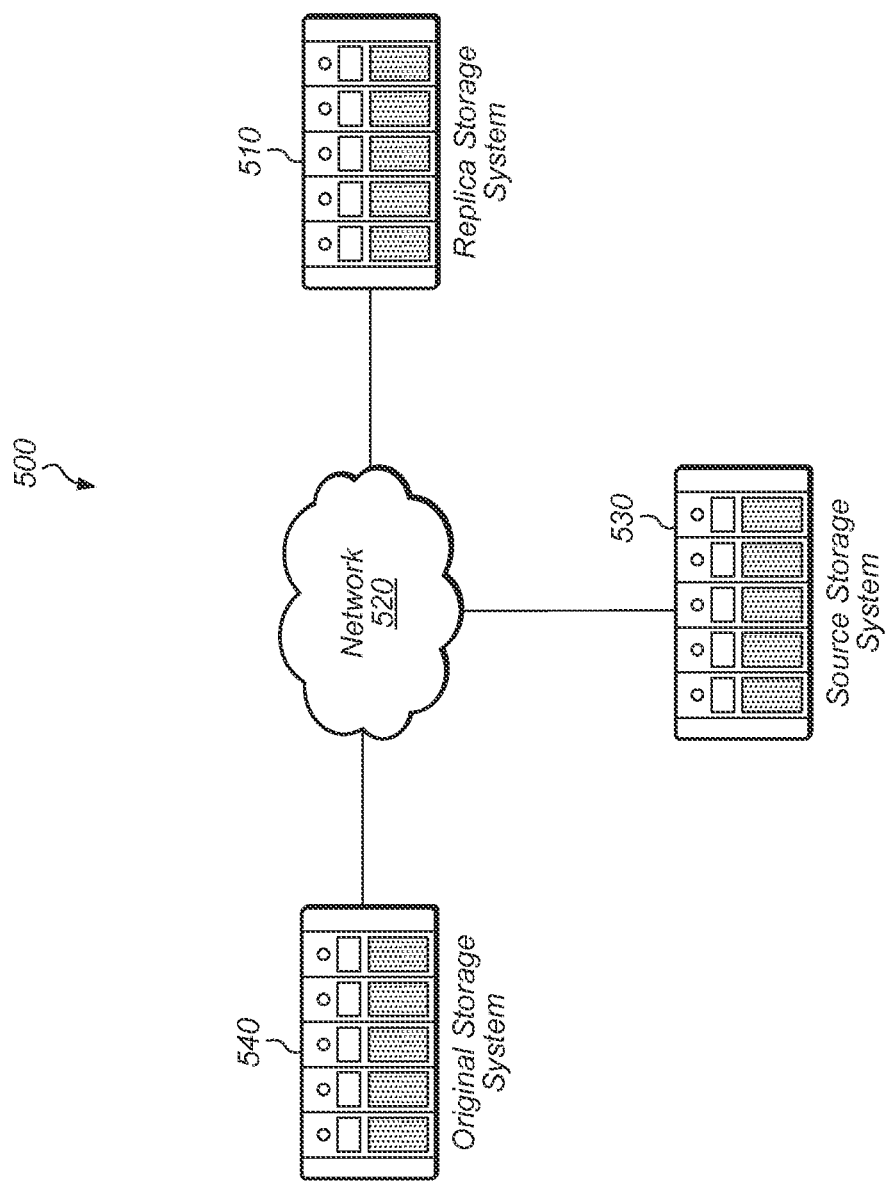
FIG. 5 is a generalized block diagram of one embodiment of a system with multiple storage arrays.

Turning now to FIG. 5, a block diagram of one embodiment of a system 500 with multiple storage arrays is shown. System 500 may include original storage array 540, replica storage array 510, and source storage array 530. In one embodiment, these arrays may be coupled together via network 520, which is representative of any number and type of network. System 500 may also include any number of other storage arrays in addition to those shown. It is noted that storage arrays 510, 530, and 540 may also be referred to as storage systems.

In one embodiment, each of storage arrays 510, 530, and 540 may include the components (e.g., storage controller, device groups) shown in storage array 105 (of FIG. 1). Additionally, each storage array may utilize volume to medium mapping tables similar to volume to medium mapping table 205 (of FIG. 2) and medium mapping tables similar to medium mapping table 300 (of FIG. 3) to track the various volumes and mediums which are utilized by the storage array.

For the purposes of this discussion, original storage array 540 represents the array on which a given volume and snapshot were first created. Replica storage array 510 may represent the array to which the given snapshot is being replicated. Source storage array 530 may represent an array containing the medium to be replicated from which replica storage array 510 is pulling missing data necessary for the given snapshot. It is noted that these designations of the various storage arrays are used in the context of a given replication operation. For subsequent replication operations, these designations may change. For example, a first snapshot may be replicated from original storage array 540 to replica storage array 510 at a particular point in time. At a later point in time, a second snapshot may be replicated from replica storage array 510 to original storage array 540. For the replication of the second snapshot, storage array 510 may be referred to as an "original" storage array while storage array 540 may be referred to as a "replica" storage array. Also, the source storage system and the original storage system may be the same for a given replication event. In other words, system 510 could pull data to replicate a medium from system 540 directly if it chooses.

In system 500, snapshots may be taken independently by original storage array 540. Then, replica storage array 510 may decide which particular snapshots to replicate when replica storage array 510 connects to original storage array 540. In this way, replica storage array 510 does not need to copy a large number of snapshots if it has not connected to original storage array 540 for a long period of time. Instead, replica storage array 510 may only choose to replicate the most recent snapshot. Alternatively, original storage array 540 may make a policy decision and notify replica storage array 510 to pull a given snapshot as embodied in a given medium. Replica storage array 510 may then choose to pull extents of the given medium from any storage array to which it has access.

In one embodiment, system 500 may implement a replication mechanism using mediums to avoid copying data. For example, suppose that M is a medium comprising a snapshot S of volume V, and that M' is a medium comprising a later snapshot S' of V. If replica storage array 510 already contains M, source storage array 530 may transfer data in M' but not in M to replica storage array 510 so as to perform the replication process of medium M' Source storage array 530 may determine which regions fall through and which regions are actually in M' by reading the medium map that it maintains.

In one embodiment, each storage array may utilize a local name for every medium maintained by the storage array, including mediums that originated locally and mediums that were replicated from other storage arrays. For mediums originating from other storage arrays, the local storage array may keep a table mapping original array ID and original medium ID to local medium ID. An example table for mapping original array ID and original medium ID to local medium ID is shown in FIG. 6. Thus, a storage array may look up mediums by original array ID, which is a partial key, and find both the original medium ID and the local medium ID. A storage array may also perform a lookup to the table using both original array ID and original medium ID to get the local medium ID. In another embodiment, each medium in system 500 could be assigned a globally-unique ID which is the same ID on all storage arrays which utilize or store the medium. This globally-unique ID may then be used as the sole identifier on any storage array of system 500.

In one embodiment, to replicate a snapshot from original storage array 540 to replica storage system 510, the following steps may be taken: First, the anchor medium corresponding to the snapshot on original storage array 540 may be made stable by taking a snapshot of the volume if necessary. If this anchor medium is already stable, then there is no need to take the snapshot. Next, replica storage system 510 may initiate the replication process by querying original storage array 540 for a list of snapshots of the volume that could be replicated. Original storage array 540 may respond with a list of possible snapshots and corresponding mediums for each snapshot. Then, the medium corresponding to the desired snapshot may be replicated to storage array 510. This medium may be called 'M'. Replica storage system 510 may then contact any source storage system 530 in system 500 with the medium M that it wants to replicate. Replica storage system 510 may utilize its mapping table to identify all of the medium extents that are available for use as sources for deduplicated data, and may also optionally supply this list of medium extents that it maintains locally to source storage system 530. Again, it is noted that source storage system 530 may be original storage system 540, or it may be another storage system to which original storage system 540 has, directly or indirectly, previously replicated medium M.

Source storage array 530 may use the list of medium extents and the medium 'M' selected for replication to build a list of information that needs to be sent to replica storage system 510 to replicate medium M. Each packet of information may be referred to as a "quantum" or an "rblock". An rblock can specify the content of a particular region of M as either medium extents that already exist on replica storage system 510 or as data that has previously been sent from source storage array 530 to replica storage system 510 for M. An rblock can also contain a list of data tuples for M. A tuple may be a combination of block ID and data for the particular region of M. An rblock may also contain a combination of references and data tuples.

Replica storage system 510 may acknowledge rblocks sent by source storage array 530. Replica storage system 510 may batch acknowledgements and send several at once rather than sending an acknowledgement after receiving each rblock. Acknowledgements may be sent using any suitable technique, including explicit acknowledgement by serial number of each rblock or acknowledging the latest serial number received with no gaps in serial number.

Source storage array 530 may keep track of the latest rblock that replica storage system 510 has acknowledged. Source storage array 530 may discard rblocks that replica storage system 510 has acknowledged since these will not need to be resent. Source storage array 530 may add the extents that replica storage array 510 acknowledges to the list of medium extents that replica storage array 510 knows about. This list may help reduce the amount of actual data that source storage array 530 sends to replica storage system 510 as part of the replication process.

The above-described techniques for performing replication offer a variety of advantages. First, data that source storage array 530 can determine already exists in a medium extent present on replica storage system 510 is not sent; instead, source storage array 530 sends a reference to the already-present data. Second, streamed rblocks do not overlap. Rather, each rblock specifies a disjoint range of content in M. Third, an rblock may only refer to a medium extent that source storage array 530 knows is on replica storage system 510, either because it was in the original list of extents sent by replica storage system 510 to source storage array 530, or because replica storage system 510 has acknowledged the extent to source storage array 530.

The above-described techniques allow system 500 to efficiently discover duplicate blocks on source storage array 530 to produce a correct duplicate. One approach which may be used involves running a differencing algorithm on source storage array 530 to determine which data blocks must be sent in full and which regions of M can be sent as references to already-extant extents. In one embodiment, for a given extent 'E', an optionally discontiguous set of rblocks with patterns may be sent first, and then a reference rblock may be sent that fully covers the extent E.

A typical medium mapping table may map extents such that <$M_1$,$offset_1$,length> maps to <$M_2$,$offset_2$>, wherein $M_1$ and $M_2$ are two separate mediums and $offset_1$ and $offset_2$ are the offsets within those mediums. It may be challenging to determine whether a particular medium is reachable multiple ways using the individual medium extent map that maps <$M_1$,$offset_1$,length>→<$M_2$,$offset_2$>. In other words, it may be challenging to determine if other medium extents also point to <$M_2$,$offset_2$>. To address this problem, a set $D_1$ of medium extents that are mapped to one another may be built. Thus, this set would include all instances of <$M_D$,$offset_D$> that are pointed to by more than one <M,offset>. This set may allow a merge of all references to the duplicated medium extent <$M_D$,$offset_D$> by ensuring that all references to blocks in the region refer to the canonical extent $M_D$, rather than to whatever medium they were in that points to $M_D$.

It may also be challenging to determine whether a particular block is a duplicate by resolving it through the medium maps, since translating a given <medium, block> results in a physical address. If blocks <$M_1$, $s_1$> and <$M_2$, $s_2$> both correspond to physical address X, it may be difficult to know when we resolve <$M_1$, $s_1$> that there are other blocks with address X. In other words, working backwards from X to the <medium, block> addresses that refer to it may be problematic. To mitigate these challenges, a set $D_2$ of medium extents may be built that are duplicates of other medium extents. This set may indicate what ranges in different mediums actually correspond to the same blocks, whether by entries in the medium table or by fully resolving the addresses. Any suitable method for building this set $D_2$ of medium extents may be utilized, depending on the embodiment. The two sets of $D_1$ and $D_2$ may be combined into a combined set D of duplicate medium extents.

Once a set of duplicate references has been built, source storage array 530 may determine which blocks need to be sent to replica storage array 510. Source storage array 530 may determine which blocks need to be sent by performing the following steps: First, the set of duplicate extents D may be provided as previously described. Next, a set of sectors Z that replica storage array 510 already knows about are initialized by inserting all of the sector ranges covered by the medium extents that replica storage array 510 sent to source storage array 530.

Next, a set of mappings P from physical addresses (X) to logical addresses (<M,s>) may be initialized to be empty. Each time actual data is sent to replica storage array 510, the corresponding mapping may be added to set P. Then, for each sector 's' in M, call a function emit_sector (M,s). Once sufficient information has been emitted, the information may be packaged into an rblock and sent to replica storage array 510. In one embodiment, the function emit_sector (M,s) may traverse the medium extent table until one of the following three cases (a, b, c) happens. Checking for these three cases may be performed in logical order. For example, the checks may be run in parallel, but case a takes precedence over case b, and case b takes precedence over case c.

The three cases (a, b, c) mentioned above are as follows: First, case a is the following: <M,s> maps to a sector in Z called <Q,t>. In this case, emit a reference <M,s>→<Q,t>. Second, case b is the following: A sector <F,t> is hit that's in D, where F≠M. This means that a medium extent map in the medium mapping table has been traversed to a different medium, and an entry has been hit which allows the medium map to be "flattened" to optimize transmission. Flattening the medium map means that a duplicate entry is being deleted and both entries may now point to the same extent. In this case, emit_sector(F,t) may be called, and then a reference <M,s>→<F,t> may be emitted.

Third, case c is the following: An actual physical mapping X is hit that contains the data for the sector. There are two options when this occurs. If P already contains a mapping from X→<O,t>, then emit a reference from <M,s>→<O,t>. Otherwise, emit the logical address of the sector—<M,s>— followed by the data for the sector. Also, add the mapping from X to <M,s> to P to allow for deduplicating on the fly to save bandwidth on the network.

In one embodiment, an optimization may be utilized. This optimization includes maintaining a list of recently sent physical addresses that map physical location X to <M,s>. This list may be used to do fine-grained deduplication on the fly. In option c above, first the list of recently-sent physical addresses may be checked. If it is discovered that <$M_2,s_2$> corresponds to physical address Y, and Y was recently sent as <$M_1,s_1$>, a reference may be sent from <$M_2,s_2$> to <$M_1,s_1$>. This step is purely optional, and the size of the list of recently-sent physical addresses can be as large or as small (including zero) as desired, with larger lists resulting in potentially less data being sent. The list of recently-sent addresses may be trimmed at any time, and any mappings may be removed. The use of table P may be omitted entirely if desired, with the only drawback being that fine grained duplicates might be sent multiple times over the network.

Another optimization is that adjacent references may be merged to save space. For example, if the references <M,s>→<O,t> and <M,s+1>→<O,t+1> were going to be sent, <M,s,2>→<O,t> could be sent instead, where the number 2 indicates the number of sectors covered by this mapping. This optimization may be used at any time. For example, if the mapping table indicates that a mapping applies for the next 16 sectors, a single mapping may be emitted that covers the next 16 sectors. This avoids having to emit 16 individual mappings and then merge them later.

It is noted that the transmission of data and mappings from source storage array 530 to replica storage array 510 may be performed using any suitable network mechanism. Similarly, acknowledgments may be sent using any suitable mechanism for acknowledgment, including the use of sequence numbers or implicit acknowledgment built into network protocols.

The above-described mechanisms may be used to back up data to a "slower" storage device such as disk or tape. This backup can proceed at full sequential write speeds, since all of the network traffic on the backup destination (replica storage array 510) may be recorded to keep track of the medium extents that are stored there. Resolving references to data stored on disk or tape could be slow using this approach. However, since network traffic is being recorded, data does not need to be processed on replica storage array 510. Instead, all of the packets that source storage array 530 sends to replica storage array 510 may be sequentially recorded, and minimal processing of metadata from the rblocks may be performed. Then, if a restore is needed, all of the replication sessions may be replayed to original storage array 540 or to another storage array.

Restoring data to another storage array could be achieved by replaying all of the desired replication streams from backup storage, in order. For example, suppose that daily replication of data was performed for every day of the month of August, with the initial replication of the volume being sent on August $1^{st}$. If a user wanted to restore the system as it looked on August 15, all of the stored streams for August 1-15 may be replayed.

The above-described mechanisms may be used to back up data to the cloud. Cloud storage may be used to preserve copies of all of the rblocks that would have been sent from source storage array 530 to replica storage array 510, and the cloud-based system may acknowledge medium extents as it receives the rblocks that contain them. A unique identifier may be assigned to each rblock, allowing a cloud-based system to efficiently store all of the rblocks, retrieving them as necessary to perform a restore from backup.

The mechanisms described herein deal may easily handle complex replication topologies. For example, suppose an original storage site is in London, with replicas in New York and Boston. The original pushes its data out to New York first. When Boston decides to replicate a snapshot, it can contact either London or New York to discover what snapshots are available for replication. Boston can then retrieve data from either London, New York, or parts from both, making the choice based on factors such as available network capacity and available system capacity (how busy the systems are). In other words, a replica storage array can pull from any source storage array that has the desired medium extents, not just the original storage array.

For example, Boston could decide to start retrieving data for snapshot S from London, but stop in the middle and switch to New York if the network connection to London became slow or the system in London became more heavily loaded. The system in New York can associate the London medium identifiers with data it has stored locally, and resume the transfer. Similarly, the system in Boston might identify the snapshot at New York initially, perhaps picking the latest snapshot stored in New York, bypassing London entirely. Boston may also contact London to identify the latest snapshot, but conduct the entire transfer with the New York replica.

Additionally, replication may also be used to preload a system with various mediums. This can be done even if it is never intended to replicate the volumes that currently use the mediums that are being preloaded. For example, mediums could be preloaded that correspond to "gold master" images of virtual machines that are commonly cloned. Then, when a new clone of the gold master is created, future replications would go very quickly because they can refer to the mediums that the replica was preloaded with. This preloading could be done with the storage arrays in close proximity, with the replica storage array then moved to a remote location. Also, coarse-grained deduplication may be performed after the fact on the preloaded data, further optimizing replication to a preloaded replica.

Turning now to FIG. 6, one embodiment of a table 600 for mapping original system ID to local medium ID. Table 600 is an example of a table which may be utilized by replica storage array 510 (of FIG. 5). Table 600 includes mediums that originated on storage arrays 530 and 540 and which are also stored on replica storage array 510. The IDs of these mediums may be different on replica storage array 510 than the IDs of these mediums on their original storage arrays, and so replica storage array 510 may utilize table 600 to map IDs from the host storage array to its own IDs. It is noted that table 600 is merely one example of a table which may be utilized to map medium IDs from an original storage array to a local storage array. In other embodiments, table 600 may be organized differently. It is also noted that other systems may have other numbers of storage arrays, and in these embodiments, table 600 may have other numbers of IDs of storage arrays which are mapped to the local storage array. It is further noted that table 600 would be unnecessary if mediums have globally unique identifiers (GUIDs). In one embodiment, a GUID may include an indication of the system that originally generated the medium (e.g., the system ID may be the upper 32 bits of the medium ID).

Referring now to FIG. 7, one embodiment of a set of tables and lists utilized during a replication process is shown. It may be assumed for the purposes of this discussion that medium 710 has been selected for replication from an original storage array to a replica storage array. Table 700 includes medium mapping table entries for medium 710, and the entries in table 700 for medium 710 are intended to represent all of the entries corresponding to medium 710 in the overall medium mapping table (not shown) of the original storage array. The original storage array may build table 700 by traversing the overall medium mapping table for all entries assigned to medium 710. Alternatively, the original storage array may not build table 700 but may access the entries corresponding to medium 710 from the overall medium mapping table. In that case, table 700 is intended to illustrate the relevant medium mapping table entries for a medium 710 selected for replication. The total range of medium 710 is from 0 to (N−1), and medium 710 may include any number of entries, depending on the embodiment.

Once medium 710 has been selected for replication, the replica storage array may generate a list of medium extents stored on the replica storage array that originated from the original storage array. Table 765 is intended to represent the mapping of external storage array medium IDs to local medium IDs on the replica storage array. For the purposes of this discussion, it may be assumed that the original storage array has an ID of 745. As shown, there is a single entry for storage array 745 in table 765. This entry maps original medium ID 725 from the original storage array to local medium ID 36 on the replica storage array. It is noted that a typical table may have a large number of entries corresponding to the original storage array. However, a single entry is shown in table 765 for ease of illustration. The medium mapping table entry for medium ID 36 is shown in table 770, which is intended to represent the medium mapping table of the replica storage array. Alternatively, in another embodiment, each medium may have a globally unique ID, and mediums may be identified by the same globally unique ID on different storage arrays. In this embodiment, the replica storage array may simply look for entries assigned to medium ID 710 in its medium mapping table.

List 715A is intended to represent an example of a list which may be sent from the replica storage array to the original storage array. The replica storage array may generate list 715A by querying table 765 which maps external storage array medium IDs to local medium IDs and compiling a list of medium extents corresponding to snapshots that originated on the original storage array. The replica storage array may send list 715A to the original storage array, and then the original storage array may filter out all medium extents that do not correspond to medium 710 and keep only the medium extents which map to extents within medium 710. Any number of entries may be included in list 715A, depending on the embodiment.

As part of the replication process, the original storage array may determine which extents of medium ID 710 need to be sent to the replica storage array and which extents can be sent as references to extents already stored on the replica storage array. Extents which can be sent as references to already-existent extents may be identified using any of a variety of techniques. For instance, if a first extent in table 700 corresponds to an extent stored in list 715A, then a reference to the extent of list 715A may be sent to the replica storage array rather than sending the first extent. Also, if duplicate extents are discovered in table 700, then a reference from a second extent to a third extent may be sent to replica storage array rather than sending the second extent. The original storage array may utilize any of a variety of techniques for determining if there are duplicate extents in list 725. Additionally, if duplicate extents are discovered in table 700, then these duplicate extents may be deduplicated as a side benefit of the replication process.

For example, in one embodiment, the original storage array may build up a list of duplicate extents that have been detected within medium 710. In order to build list 730 of duplicate extents, the original storage array may traverse table 700 entry by entry to determine the underlying mappings which exist for each extent. For example, the fourth entry of table 700 may be traversed down to its underlying medium of 650. Then, a lookup of the overall medium mapping table 755 may be performed for the specified range of medium ID 650 to determine if medium ID 650 has an underlying medium. The second entry of medium mapping table 755 shows the corresponding entry for this specific range of medium ID 650. In this case, the range of C to (D−1) of medium ID 650 has an underlying medium of 645 at an offset of 0 after applying the offset of −C from the entry in table 755. Therefore, the extent corresponding to the fourth entry of table 700 is a duplicate extent since it maps to the same extent as the third entry of table 700. Accordingly, an entry may be recorded in duplicate extents table 730 corresponding to the fourth and third entries of table 700. Additionally, after detecting these duplicate extents, the medium mapping table entry for range C to (D−1) of medium ID 710 may be collapsed. Although not shown in FIG. 7, the corresponding entry of the medium mapping table may be modified to point to range 0 to (A−1) of medium ID 645 rather than having it point to range C to (D−1) of medium ID 650. This helps create a shortcut for the medium mapping table, which is an additional side benefit of performing the replication process for medium ID 710.

Additionally, duplicate extents table 730 may keep track of duplicate blocks within medium ID 710 that map to the same physical address. When separate blocks that point to the same physical address are detected, an entry may be stored in duplicate extents table 730 for the duplicate pair of blocks. Duplicate blocks may be detected by performing a lookup of the address translation table (not shown) for each block within medium 710 and compiling a list of the physical pointer values returned from each of the lookups. For each pair of matching physical pointer values which are found, an entry may be recorded in duplicate extents table 730. It may be assumed for the purposes of this discussion that the block corresponding to medium ID 710 for range D to (E−1) is a duplicate block which has the same physical pointer value as the block corresponding to medium 710 for range M to (N−1). Therefore, the second entry of duplicate extents table 730 stores the mapping of these duplicate blocks.

Also, a physical to logical address mappings table 760A may be created to store physical to logical mappings of data that is sent to the replica storage array. The physical to logical address mappings table 760A may be initialized to be empty and mappings may be added after the actual data is sent to the replica storage array. Once duplicate extents table 730 and physical to logical address mappings table 760A have been created, the original storage array may traverse table 700 entry by entry and determine for each entry if the actual data needs to be sent or if a reference to an already-existent extent on the replica storage array may be sent.

While traversing table 700 for each sector of medium ID 710, multiple conditions may be checked for each sector. First, it may be determined if the sector of medium ID 710 maps to a sector in list 715A. If the sector maps to one of the sectors indicated by list 715A, then a reference to this sector from list 715A may be sent to the replica storage array. For example, for the first entry of table 700, a lookup of list 715A will hit for this sector of medium ID 725 corresponding to range 0-(A−1). As can be seen from the first entry of medium mapping table 755, range 0 to (A−1) of medium ID 725 maps to range 0 to (A−1) of medium ID 710. Therefore, rather than sending the data for this sector to the replica storage array, a reference to the sector which already exists on the replica storage array may be sent.

After checking for the first condition and determining the first condition is not met, a second condition may be checked for a given sector of medium ID 710. The second condition includes checking if the sector of medium ID 710 maps to a sector in duplicate extents table 730. If the sector of medium ID 710 already maps to a sector in duplicate extents table 730 which has already been sent to and acknowledged by the replica storage array, then a reference to the duplicate sector may be sent to the replica storage array. For example, for the fourth entry of table 700 corresponding to range C to (D−1) of medium ID 710, an entry exists in duplicate extents table 730 for this range of medium 710. Therefore, a reference to the range listed in the duplicate range column of table 730, or range B-(C−1), may be sent to the replica storage array rather than sending the actual data. Similarly, for the last entry in table 700 corresponding to range M-(N−1), a reference to range D-(E−1) (as indicated by the second entry in table 730) may be sent to the replica storage array rather than sending the actual data of range M-(N−1).

If the second condition is not met, then the actual physical mapping that contains the data for the sector may be located by performing a lookup of the address translation table. Once the specific physical mapping has been located, then a lookup of physical to logical address mappings table 760A may be performed to determine if the physical mapping is already stored in table 760A. If the physical mapping is already stored in table 760A, then a reference to the sector indicated by the corresponding entry of table 760A may be sent to the replica storage array. In one embodiment, the reference may be in the form of <medium ID, range>. If the physical mapping is not already stored in table 760A, then the actual data for the sector may be sent to the replica storage array and then this physical mapping may be added to table 760A.

After the replica storage array receives a reference or data from the original storage array, the replica storage array may send an acknowledgement to the original storage array. In some cases, the replica storage array may batch acknowledgements and send multiple acknowledgements at a time rather than sending each acknowledgement individually. Alternatively, the replica storage array may send an acknowledgement in the form of "received all data up to medium X, offset Y". When the original storage array receives an acknowledgment for a given extent, the original storage array may then add the given extent to list 715A.

It is to be understood that only a portion of each of tables and lists 700, 715, 730, and 755 are shown, with the portion being relevant to the above discussion. It is noted that each of the tables and lists of FIG. 7 may be implemented in a variety of ways with additional information than what is shown and/or with more entries than are shown. It is also noted that any suitable data structure may be used to store the data shown in the tables and lists of FIG. 7.

Turning now to FIG. 8, one embodiment of a set of tables and lists for use in the replication process is shown. The tables and lists shown in FIG. 8 and the following discussion is a continuation of the replication example described in FIG. 7. In one embodiment, the original storage array may generate table 800 prior to replicating medium ID 710 to keep track of which extents need to be sent as data and which extents should be sent as references to other extents. Alternatively, the original storage array may generate table 800 incrementally as replication proceeds. As shown in FIG. 8, table 800 is generated based on the information contained in the tables shown in FIG. 7 for medium ID 710. Using the information stored in table 700, list 715A, and duplicate extents table 730, the original storage array may generate table 800 and store an indication for each extent as to whether it should be sent as a reference or as data.

For example, the first extent of medium ID 710 for range 0 to (A−1), corresponding to the first entry in table 800, may be sent as a reference since this extent is already stored (as range 0 to (A−1) of medium ID 725) on the replica storage array as indicated by the first entry of list 715A. The second extent of medium ID 710 may be sent as data since this extent does not map to an entry in list 715A or duplicate extents table 730. After the original storage array receives an acknowledgement from the replica storage array that is has received the data corresponding to the second extent of medium ID 710, the original storage array may add this extent to list 715 since this extent is now stored on the replica storage array. List 715B represents list 715 at the point in time after the original storage array receives the acknowledgement from the replica storage array regarding the second extent of medium ID 710. Similarly, anytime an acknowledgement is sent by the replica storage array and received by the original storage array regarding a given extent, the given extent may be added to list 715 at that time.

The third extent of medium ID 710 may be sent as data since this extent does not map to an entry in list 715B or duplicate extents table 730. The fourth extent of medium ID 710 may be sent as a reference to the third extent of medium ID 710 since the fourth extent is the same as third extent as indicated by duplicate extents table 730. The fifth extent of medium ID 710 may be sent as data since this extent does not map to an entry in list 715B or duplicate extents table 730. Any number of extents after the fifth extent may be sent in a similar manner. Finally, the last extent of medium ID 710 may be sent as a reference since this extent is the same as fifth extent as indicated by duplicate extents table 730. After acknowledgements are received by the original storage array for the third and fifth extents of medium ID 710, these extents may be added to list 715. List 715C represents list 715 after these acknowledgements have been received by the original storage array.

Additionally, physical to logical address mappings table 760 may be updated after the data for the extents of the second, third, and fourth entries is sent to the replica storage array. As shown in table 760B, the physical address of the second entry (sector <710, 1>) is represented as 762X, the physical address of the third entry (sector <710, 2>) is represented as 763X, and the physical address of the fourth entry (sector <710, 3>) is represented as 764X.

A lookup of physical to logical address mappings table 760B may be performed for subsequent entries of table 800 prior to sending data to the replica storage array. Alternatively, in another embodiment, a list of recently sent physical addresses may be maintained. The size of the list of recently sent physical addresses may be as large or as small as desired, depending on the embodiment. If it is discovered that the address for a sector is located in table 760B (or the list of recently sent physical addresses), then a reference to the previously sent sector may be sent to the replica storage array rather than the corresponding data. Also, if an address for a sector is already stored in table 760B, fine-grained deduplication may be performed on these two sectors since they both point to the same physical address. This allows for an additional side benefit of the replication process of enabling fine-grained deduplication to be performed on the fly.

Figure 9:
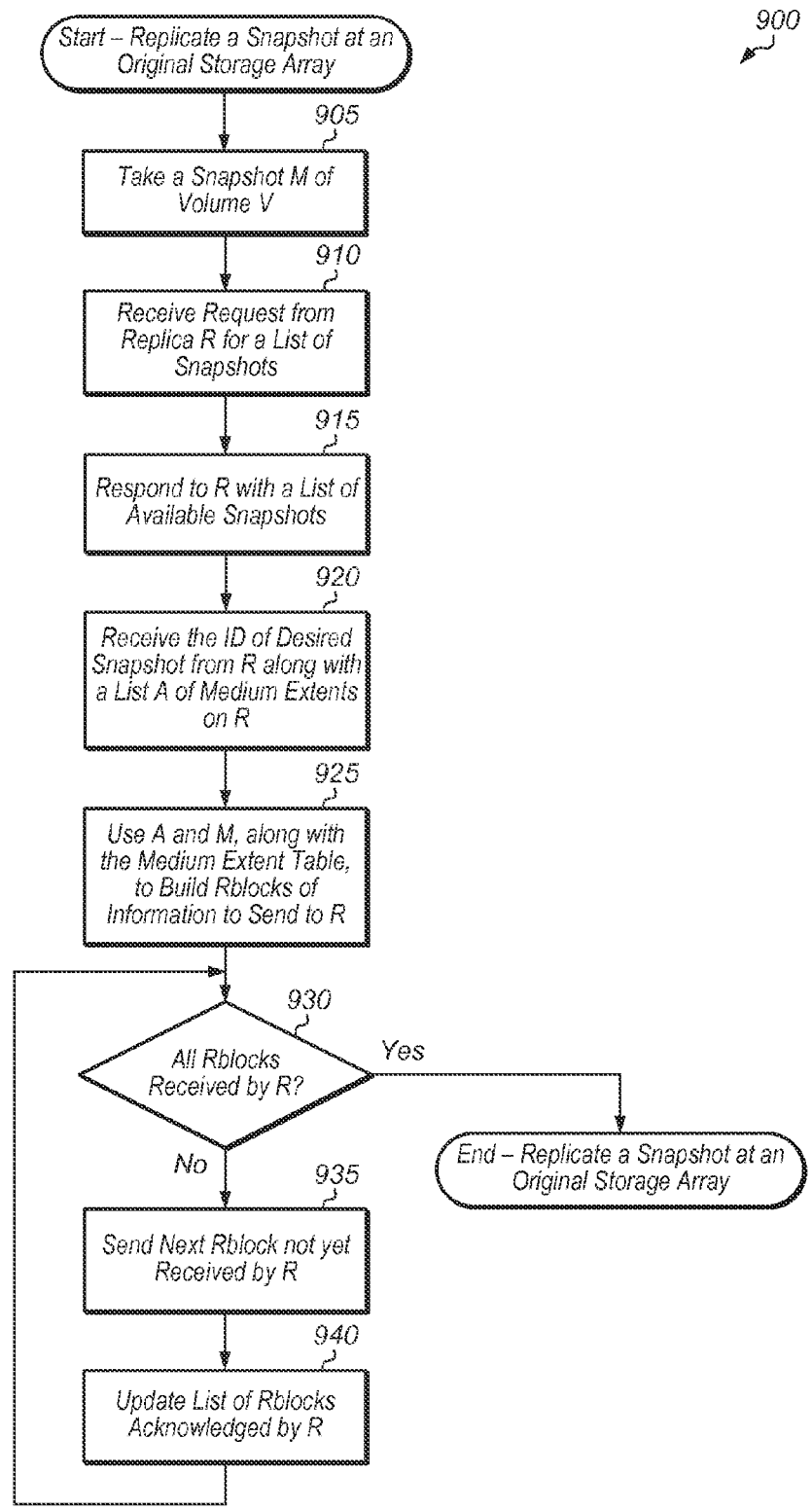
FIG. 9 is a generalized flow diagram illustrating one embodiment of a method for replicating a snapshot at an original storage array.

Referring now to FIG. 9, one embodiment of a method 900 for replicating a snapshot at an original storage array is shown. The components embodied in system 100 described above (e.g., storage controller 110) may generally operate in accordance with method 900. In addition, the steps in this embodiment are shown in sequential order. However, some steps may occur in a different order than shown, some steps may be performed concurrently, some steps may be combined with other steps, and some steps may be absent in another embodiment.

An original storage array may take a snapshot 'M' of a volume 'V' (block 905). It is noted that block 905 may only be performed if needed. For example, if M is already stable, then a snapshot does not need to be taken. Next, the original storage array may receive a request from a replica storage array 'R' for a list of snapshots (block 910). The original storage array may respond to R with a list of available snapshots including M (block 915). The original storage array may then receive an ID of a desired snapshot from R along with a list 'A' of medium extents that are already stored on R (block 920). The original storage array may then use A and M, along with the medium extent table, to build rblocks of information to send to R (block 925).

The original storage array may check to determine if all rblocks have been received by R (conditional block 930). If all rblocks have been received by R (conditional block 930, "yes" leg), then method 900 is finished. If not all of the rblocks have been received by R (conditional block 930, "no" leg), then the original storage array may send the next rblock not yet received by R (block 935). Then, the original storage array may update the list of rblocks acknowledged by R (block 940). After block 945, method 900 may return to block 930. It is noted that replica storage array 'R' may also receive rblocks from one or more source storage arrays other than the original storage array. It is noted that the original storage array may retransmit rblocks which are not acknowledged.

Figure 10:
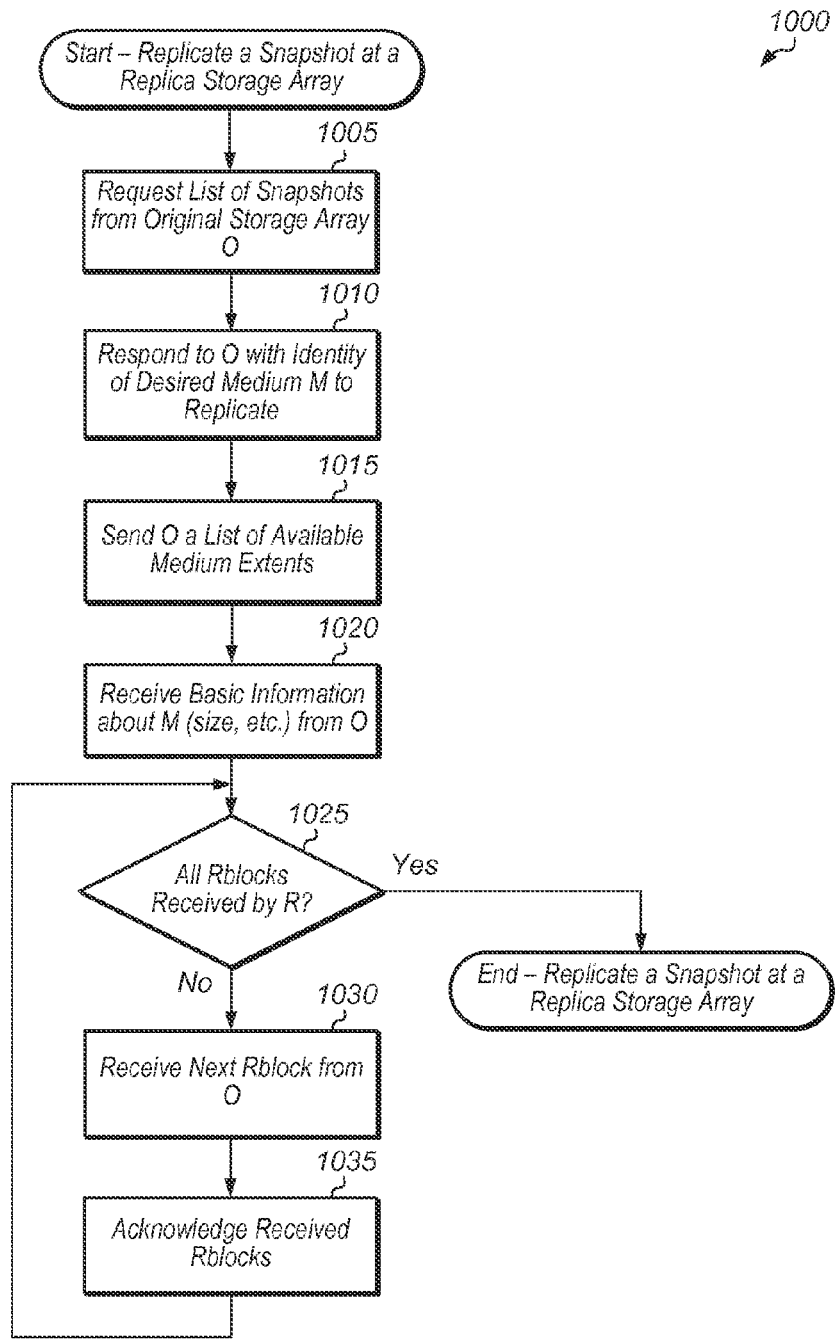
FIG. 10 is a generalized flow diagram illustrating one embodiment of a method for replicating a snapshot at a replica storage array.

Turning now to FIG. 10, one embodiment of a method 1000 for replicating a snapshot at a replica storage array is shown. The components embodied in system 100 described above (e.g., replica storage array 160) may generally operate in accordance with method 1000. In addition, the steps in this embodiment are shown in sequential order. However, some steps may occur in a different order than shown, some steps may be performed concurrently, some steps may be combined with other steps, and some steps may be absent in another embodiment.

The replica storage array 'R' may request a list of snapshots from the original storage array 'O' (block 1005). After receiving the list of snapshots, R may respond to O with the identity of the desired medium 'M' to replicate (block 1010). R may also send O a list of available medium extents which are already stored on R (block 1015). R may receive basic information (e.g., size) about the desired medium 'M' from O (block 1020).

R may determine if it has received all rblocks of M (conditional block 1025). If R has received all rblocks of M (conditional block 1025, "yes" leg), then method 1000 may be finished (block 1020). If R has not received all rblocks of M (conditional block 1025, "no" leg), then R may receive the next rblock from O or from another source storage array (block 1030). Then, R may acknowledge the received rblock (block 1035). Alternatively, R may perform bulk acknowledgements. After block 1035, method 1000 may return to block 1025.

Figure 11:
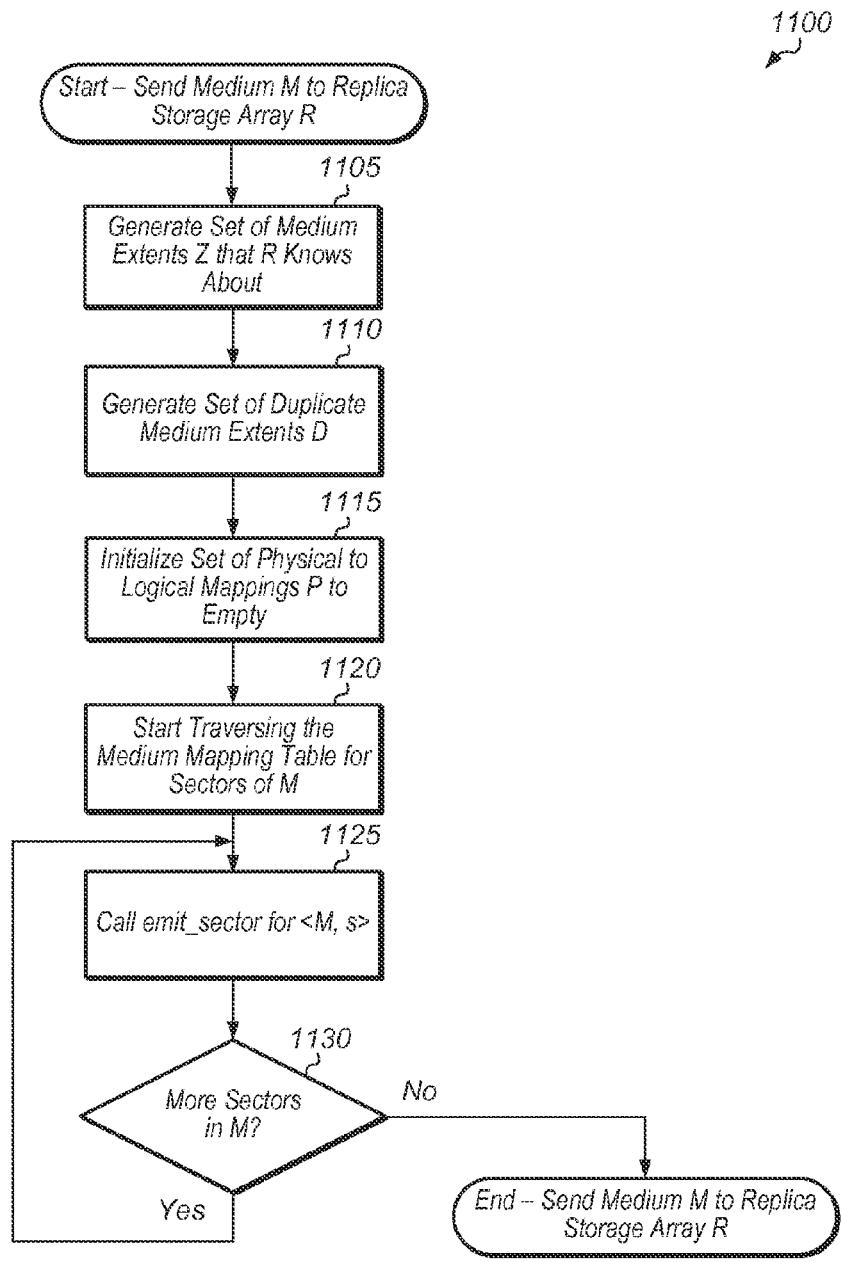
FIG. 11 is a generalized flow diagram illustrating one embodiment of a method for sending a medium 'M' to a replica storage array 'R'.

Referring now to FIG. 11, one embodiment of a method 1100 for sending a medium 'M' to a replica storage array 'R' is shown. The components embodied in system 100 described above (e.g., storage controller 110) may generally operate in accordance with method 1100. In addition, the steps in this embodiment are shown in sequential order. However, some steps may occur in a different order than shown, some steps may be performed concurrently, some steps may be combined with other steps, and some steps may be absent in another embodiment.

The original storage array 'O' may generate a set of extents 'Z' that the replica storage array 'R' knows about (block 1105). A set of duplicate medium extents 'D' of the desired medium 'M' may also be generated (block 1110). This set D may include pairs of extents which map to the same underlying extent as well as pairs of extents that map to the same physical pointer value. Also, a set of physical to logical mappings 'P' may be initialized to empty (block 1115). Next, O may start traversing the medium mapping table for sectors of M (block 1120). When selecting a sector 's' of the medium mapping table for medium 'M', O may generate a call to emit_sector for <M, s> (block 1125). The implementation of emit_sector is described below in method 1200 (of FIG. 12) in accordance with one embodiment. In one embodiment, emit_sector may be implemented using a software routine. In another embodiment, emit_sector may be implemented in logic. In a further embodiment, any combination of software and/or hardware may be utilized to implement emit_sector.

After block 1125, O may determine if there are more sectors in 'M' (conditional block 1130). If there are more sectors in 'M' (conditional block 1130, "yes" leg), then a call to emit_sector for <M, s> may be generated for the next sector (block 1125). If there are no more sectors in 'M' (conditional block 1130, "no" leg), then method 1100 may end.

Figure 12:
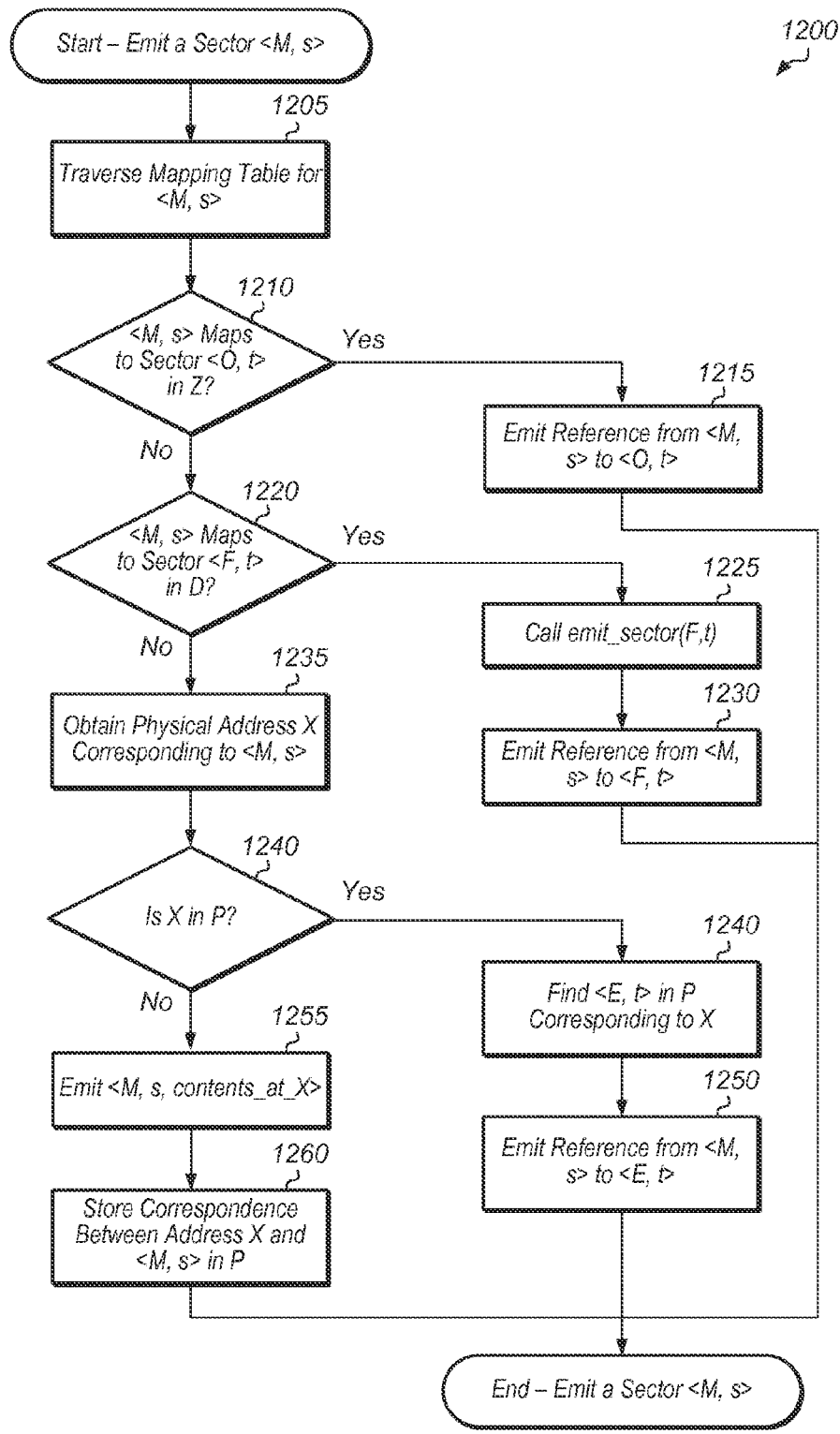
FIG. 12 is a generalized flow diagram illustrating one embodiment of a method for emitting a sector <M, s>.

Referring now to FIG. 12, one embodiment of a method 1200 for emitting a sector <M, s> is shown. The components embodied in system 100 described above (e.g., storage controller 110) may generally operate in accordance with method 1200. In addition, the steps in this embodiment are shown in sequential order. However, some steps may occur in a different order than shown, some steps may be performed concurrently, some steps may be combined with other steps, and some steps may be absent in another embodiment.

The original storage array 'O' may traverse the mapping table for <M, s> (block 1205). If <M, s> maps to sector <O, t> in Z (conditional block 1210, "yes" leg), then the reference from <M, s> to <O, t> may be emitted (block 1215). It is noted that 'Z' is the set of extents that the replica storage array 'R' already stores and which originated from O, and R may send a list of the set of extents Z to O. After block 1215, method 1200 may end.

If <M, s> does not map to sector <O, t> in Z (conditional block 1210, "no" leg), then it may be determined if <M, s> maps to sector <F, t> in duplicate medium extents 'D' (conditional block 1220). If <M, s> maps to sector <F, t> in D (conditional block 1220, "yes" leg), then a call to emit_sector for <F, t> may be generated (block 1225). After block 1225, the reference from <M, s> to <F, t> may be emitted (block 1230). After block 1230, method 1200 may end.

If <M, s> does not map to a sector <F, t> in D (conditional block 1220, "no" leg), then the physical address 'X' corresponding to <M, s> may be obtained from the address translation table (block 1235). Next, it may be determined if X is in the physical to logical mappings 'P' (conditional block 1240). The physical to logical mappings list 'P' is a list of physical to logical mappings corresponding to data that has already been sent to R. If X is in the physical to logical mappings 'P' (conditional block 1240, "yes" leg), then the sector <E, t> in P corresponding to X may be found (block 1245). Next, the reference from <M, s> to <E, t> may be emitted (block 1250). After block 1250, method 1200 may end.

If X is not in the physical to logical mappings 'P' (conditional block 1240, "no" leg), then the sector data corresponding to <M, s, contents_at_X> may be emitted (block 1255). After block 1255, the correspondence between address X and <M, s> may be stored in P (block 1260). After block 1260, method 1200 may end.

Figure 13:
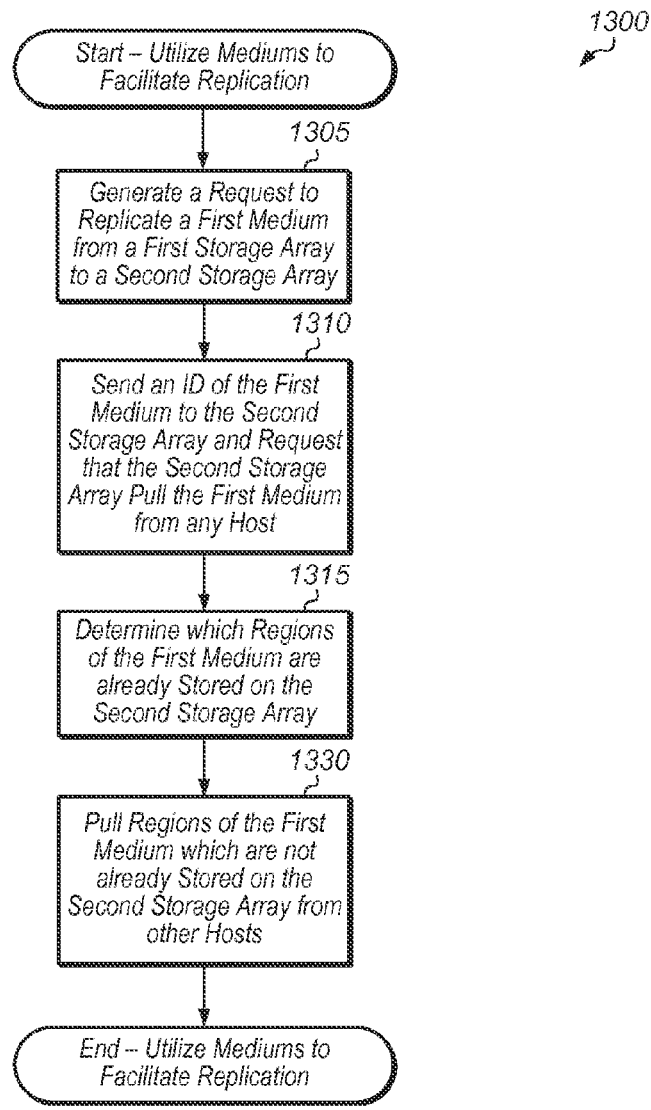
FIG. 13 is a generalized flow diagram illustrating one embodiment of a method for utilizing mediums to facilitate replication.

Referring now to FIG. 13, one embodiment of a method 1300 for utilizing mediums to facilitate replication is shown. The components embodied in system 100 described above (e.g., storage controller 110) may generally operate in accordance with method 1300. In addition, the steps in this embodiment are shown in sequential order. However, some steps may occur in a different order than shown, some steps may be performed concurrently, some steps may be combined with other steps, and some steps may be absent in another embodiment.

In one embodiment, a request to replicate a first medium from a first storage array to a second storage array may be generated (block 1305). The request may be generated by the first storage array or the second storage array, depending on the embodiment. It may be assumed for the purposes of this discussion that the first medium is already read-only. If the first medium is not read-only, then a snapshot of the first medium may be taken to make the first medium stable.

Next, in response to detecting this request, the first storage array may send an identifier (ID) of the first medium to the second storage array and request that the second storage array pull the first medium (or portions thereof) from any host to which it has access (block 1310). Alternatively, the first storage array may notify the second storage array that the first storage array will push the first medium to the second storage array. In one embodiment, the first medium may be identified based only by this medium ID. In one embodiment, the ID of the first medium may be a numeric value such as an integer, although the ID may be stored as a binary number. Also, in some embodiments, the age of a given medium relative to another medium may be determined based on a comparison of the IDs of these mediums. For example, for two mediums with IDs 1317 and 1319, medium ID 1317 has a lower ID than medium ID 1319, so therefore, it may be recognized that medium ID 1317 is older (i.e., was created prior to) than medium ID 1319.

After receiving the ID of the first medium and the request to pull the first medium from any host, it may be determined which regions of the first medium are already stored on the second storage array (block 1315). In one embodiment, the second storage array may identify regions which originated from the first storage array and which are already stored on the second storage array, and then the second storage array may send a list of these regions to the first storage array. The first storage array may then use this list to determine which regions of the first medium are not already stored on the second storage array. Then, the first storage array may send a list of these regions to the second storage array. In other embodiments, other techniques for determining which regions of the first medium are not already stored on the second storage array may be utilized.

After block 1315, the second storage array may pull regions of the first medium which are not already stored on the second storage array from other hosts (block 1320). For example, the second storage array may be connected to a third storage array, and the second storage array may send a list of regions it needs to the third storage array and request that the third storage array send any regions from the list which are stored on the third storage array.

Figure 14:
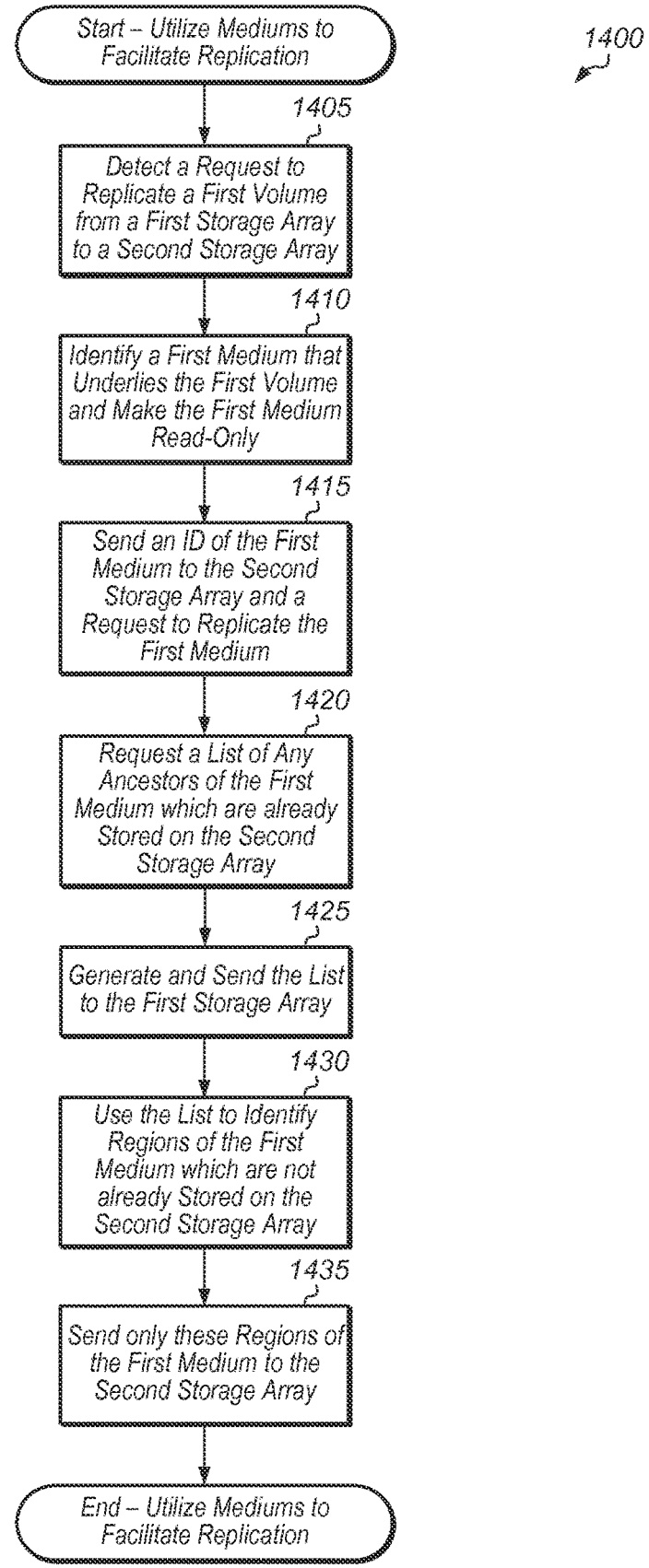
FIG. 14 is a generalized flow diagram illustrating another embodiment of a method for utilizing mediums to facilitate replication.

Referring now to FIG. 14, another embodiment of a method 1400 for utilizing mediums to facilitate replication is shown. The components embodied in system 100 described above (e.g., storage controller 110) may generally operate in accordance with method 1400. In addition, the steps in this embodiment are shown in sequential order. However, some steps may occur in a different order than shown, some steps may be performed concurrently, some steps may be combined with other steps, and some steps may be absent in another embodiment.

A request to replicate a first volume from a first storage array to a second storage array may be detected (block 1405). In one embodiment, the first storage array may decide to replicate the first volume to the second storage array. Alternatively, in another embodiment, the second storage array may request for the first volume to be replicated. In response to detecting the request to replicate the first volume, the first storage array may identify a first medium that underlies the first volume and make the first medium read-only (block 1410). In one embodiment, the first medium may be made read-only by taking a snapshot of the first volume. Next, the first storage array may send an identifier (ID) of the first medium to the second storage array along with a request to replicate the first medium (block 1415). In various embodiments, the request to replicate the first medium may be implicit or it may be an actual command. In some cases, the request to replicate the first medium may indicate if the first storage array will be pushing data to the second storage array, or if the second storage array will be pulling data from the first storage array and any other storage arrays. It may be assumed for the purposes of this discussion that the first storage array will be pushing data to the second storage array during the replication process. However, in other embodiments, the second storage array may pull data from the first storage array and other storage arrays.

The first storage array may request a list of any ancestors of the first medium which are already stored on the second storage array (block 1420). Alternatively, the first storage array may request a list of any read-only mediums which are older than the first medium. In one embodiment, the second storage array may identify mediums older than the first medium by selecting medium IDs which are lower than the first medium ID. For example, if the first medium ID is 1520, then the second storage array may identify all read-only mediums with IDs lower than 1520 which are stored on the second storage array. In a further embodiment, the first storage array may request an ID of the youngest read-only medium stored on the second storage array which is older than the first medium. If the first medium ID is 1520, then the second storage array would search for the highest medium ID which is less than 1520 and then send this ID to the first storage array. This ID may be 1519, 1518, 1517, or whichever medium ID is below and closest to 1520 and is stored in a read-only state on the second storage array.

In a further embodiment, the first storage array may request for the second storage array to identify the youngest ancestor of the first medium which is stored on the second storage array. For example, if the first medium ID is 1560, and if there are four ancestors of the first medium stored on the second storage array which are medium IDs 1555, 1540, 1530, and 1525, then the second storage array may identify medium ID 1555 as the youngest ancestor of medium ID 1560. It may be assumed for the purposes of this discussion that all ancestors of the first medium are read-only. In a still further embodiment, the first storage array may request for the second storage array to identify the youngest medium stored on the second storage array. For example, in one scenario, the second storage array may only store snapshots from a single volume, and so in that scenario, the most recent snapshot stored on the second storage array will be the youngest ancestor of the first medium.

Next, in response to receiving the request for a list of ancestors of the first medium which are already stored on the second storage array, the second storage array may generate and send the list to the first storage array (block 1425). In one embodiment, the second storage array may be able to determine the ancestors of the first medium after receiving only the ID of the first medium. For example, the second storage array may already know which volume is associated with the first medium (e.g., if the second storage array generated the replication request for the first volume), and the second storage array may have received previous snapshots associated with the first volume. Therefore, the second storage array may identify all previous snapshots associated with the first volume as ancestors of the first medium. In another embodiment, the first storage array may send an ID of each ancestor of the first medium to the second storage array along with the request in block 1420. Alternatively, in a further embodiment, rather than requesting a list of ancestors, the first storage array may request a list of any read-only mediums stored on the second storage array which are older (i.e., have lower ID numbers) than the first medium. It is noted that block 1420 may be omitted in some embodiments, such that the second storage array may generate and send a list of first medium ancestors (or the other lists described above) to the first storage array automatically in response to receiving a request to replicate the first medium.

In response to receiving the list of ancestors of the first medium which are already stored on the second storage array, the first storage array may use the list to identify regions of the first medium which are not already stored on the second storage array (block 1430). Then, the first storage array may send only these regions of the first medium to the second storage array (block 1435).

It is noted that in the above description, it is assumed that when a medium ID is generated for a new medium, the most recently generated medium ID is incremented by one to generate the new medium ID. For example, medium ID 1610 will be followed by 1611, 1612, and so on for new mediums which are created. Alternatively, the medium ID may be incremented by two (or other numbers), such that medium ID 1610 will be followed by 1612, 1614, and so on. However, it is noted that in other embodiments, medium IDs may be decremented when new mediums are created. For example, the first medium which is created may get the maximum possible ID, and then for subsequent mediums, the ID may be decremented. In these other embodiments, the above described techniques may be modified to account for this by recognizing that lower IDs represent younger mediums and higher IDs represent older mediums.

It is noted that the above-described embodiments may comprise software. In such an embodiment, the program instructions that implement the methods and/or mechanisms may be conveyed or stored on a non-transitory computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a first storage array configured to:
responsive to a request to replicate a snapshot of a volume from a first storage array to a second storage array, identify a group of data corresponding to the snapshot;
during replication of the group of data from the first storage array to the second storage array, determine that a non-replicated region of the group is a duplicate of a replicated region of the group; and
in response to the first storage array determining that the non-replicated region is a duplicate of the replicated region stored on the second storage array, send, from the first storage array to the second storage array, a reference to the non-replicated region instead of sending data for the non-replicated region, the reference including an address where the non-replicated region is stored on the first storage array;
maintain a second list of regions which are already stored on the second storage array and which map to a region of the group of data; and
a second storage array configured to, responsive to detecting the request to replicate the snapshot of the volume from the first storage array to the second storage array:
identify a plurality of regions stored on the second storage array which correspond to groups of data that originated on the first storage array; and
send a first list of the plurality of regions to the first storage array;
wherein the first storage array is remote from the second storage array.

2. The system as recited in claim 1, wherein the first storage array is further configured to:
receive the first list from the second storage array;
for each region of the first list:
determine if the region maps to any region of the group of data; and
store the region in the second list responsive to determining the region maps to a given region of the group of data.

3. The system as recited in claim 2, wherein the first storage array is further configured to add a first region to the second list responsive to sending the first region to the second storage array and receiving an acknowledgement from the second storage array that the second storage array has received the first region.

4. The system as recited in claim 3, wherein the first storage array is further configured to add a second region to the second list responsive to receiving an acknowledgement from the second storage array that the second storage array has received the second region from a third storage array.

5. The system as recited in claim 3, wherein the first storage array is further configured to generate a third list of duplicate regions of the group of data that are mapped to each other, wherein the third list is generated by traversing a medium mapping table for each region of the group of data.

6. The system as recited in claim 5, wherein the first storage array is further configured to:
maintain a fourth list of mappings, wherein each entry of the fourth list maps a physical location to a region of the group of data that has already been sent to the second storage array; and
prior to sending data corresponding to a given physical location to the second storage array, check the fourth list for a match to the given physical location.

7. A method comprising:
responsive to a request to replicate a snapshot of a volume from a first storage array to a second storage array:
identifying a group of data corresponding to the snapshot;
during replication of the group of data from the first storage array to the second storage array, determining that a non-replicated region of the group is a duplicate of a replicated region of the group;
in response to the first storage array determining that the non-replicated region is a duplicate of the replicated region stored on the second storage array, sending, from the first storage array to the second storage array, a reference to the non-replicated region instead of sending data for the non-replicated region, the reference including an address where the non-replicated region is stored on the first storage array;
identifying a plurality of regions stored on the second storage array which correspond to groups of data that originated on the first storage array;
sending a first list of the plurality of regions from the second storage array to the first storage array;
maintaining a second list of regions which are already stored on the second storage array and which map to a region of the group of data, wherein the second list is maintained on the first storage array; and
wherein the first storage array is remote from the second storage array.

8. The method as recited in claim 7, further comprising:
receiving the first list from the second storage array;
for each region of the first list:
determining if the region maps to any region of the group of data; and
storing the region in the second list responsive to determining the region maps to a given region of the group of data.

9. The method as recited in claim 8, further comprising adding a first region to the second list responsive to sending the first region to the second storage array and receiving an acknowledgement from the second storage array that the second storage array has received the first region.

10. The method as recited in claim 9, further comprising adding a second region to the second list responsive to receiving an acknowledgement from the second storage array that the second storage array has received the second region from a third storage array.

11. The method as recited in claim 9, further comprising generating a third list of duplicate regions of the group of data that are mapped to each other, wherein the third list is generated by traversing a medium mapping table for each region of the group of data.

12. The method as recited in claim 11, further comprising:
maintaining a fourth list of mappings, wherein each entry of the fourth list maps a physical location to a region of the group of data that has already been sent to the second storage array; and prior to sending data corresponding to a given physical location to the second storage array, checking the fourth list for a match to the given physical location.

13. A non-transitory computer readable storage medium storing program instructions, wherein the program instructions are executable by a processor to:

responsive to a request to replicate a snapshot of a volume from a first storage array to a second storage array:
identify a group of data corresponding to the snapshot;
during replication of the group of data from the first storage array to the second storage array, determine that a non-replicated region of the group is a duplicate of a replicated region of the group;
in response to the first storage array determining that the non-replicated region is a duplicate of the replicated region stored on the second storage array, send, from the first storage array to the second storage array, a reference to the non-replicated region instead of sending data for the non-replicated region, the reference including an address where the non-replicated region is stored on the first storage array;
identify a plurality of regions stored on the second storage array which correspond to groups of data that originated on the first storage array;
send a first list of the plurality of regions from the second storage array to the first storage array;
maintain a second list of regions which are already stored on the second storage array and which map to a region of the group of data, wherein the second list is maintained on the first storage array; and
wherein the first storage array is remote from the second storage array.

14. The computer readable storage medium as recited in claim 13, wherein the program instructions are further executable by a processor to:
receive the first list from the second storage array;
for each region of the first list:
determine if the region maps to any region of the group of data; and
store the region in the second list responsive to determining the region maps to a given region of the group of data.

15. The computer readable storage medium as recited in claim 14, wherein the program instructions are further executable by a processor to add a first region to the second list responsive to sending the first region to the second storage array and receiving an acknowledgement from the second storage array that the second storage array has received the first region.

16. The computer readable storage medium as recited in claim 15, wherein the program instructions are further executable by a processor to add a second region to the second list responsive to receiving an acknowledgement from the second storage array that the second storage array has received the second region from a third storage array.

17. The computer readable storage medium as recited in claim 15, wherein the program instructions are further executable by a processor to generate a third list of duplicate regions of the group of data that are mapped to each other, wherein the third list is generated by traversing a medium mapping table for each region of the group of data.

* * * * *